(12) United States Patent
Nagatoshi

(10) Patent No.: US 9,995,917 B2
(45) Date of Patent: Jun. 12, 2018

(54) PROJECTION ZOOM LENS AND PROJECTION TYPE DISPLAY DEVICE

(71) Applicant: FUJIFILM Corporation, Tokyo (JP)

(72) Inventor: Yukiko Nagatoshi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 14/708,645

(22) Filed: May 11, 2015

(65) Prior Publication Data

US 2015/0241668 A1 Aug. 27, 2015

Related U.S. Application Data

(63) Continuation of application No. PCT/JP2013/006719, filed on Nov. 15, 2013.

(30) Foreign Application Priority Data

Nov. 19, 2012 (JP) ................. 2012-253319

(51) Int. Cl.
| | |
|---|---|
| *G02B 15/14* | (2006.01) |
| *G02B 13/16* | (2006.01) |
| *G02B 15/173* | (2006.01) |
| *G02B 15/17* | (2006.01) |
| *G02B 15/20* | (2006.01) |
| *G02B 27/00* | (2006.01) |
| *G02B 13/22* | (2006.01) |

(52) U.S. Cl.
CPC ............ *G02B 13/16* (2013.01); *G02B 13/22* (2013.01); *G02B 15/17* (2013.01); *G02B 15/173* (2013.01); *G02B 15/20* (2013.01); *G02B 27/0025* (2013.01)

(58) Field of Classification Search
CPC ...................................................... G02B 13/16
USPC ........................................................ 359/683
See application file for complete search history.

(56) References Cited

U.S. PATENT DOCUMENTS

| | | | |
|---|---|---|---|
| 4,906,079 A | 3/1990 | Mihara et al. | |
| 4,969,721 A | 11/1990 | Mihara | |

(Continued)

FOREIGN PATENT DOCUMENTS

| | | |
|---|---|---|
| JP | 63-287810 | 11/1988 |
| JP | 01-185608 | 7/1989 |

(Continued)

OTHER PUBLICATIONS

International Search Report, PCT/JP2013/006719, dated Mar. 18, 2014.

*Primary Examiner* — James Jones

(74) *Attorney, Agent, or Firm* — Young & Thompson

(57) ABSTRACT

A projection zoom lens is configured to have an intermediate group that essentially consists of two or three moving lens groups positioned between a first lens group and a final lens group, both of which have positive refractive powers and are fixed while changing magnification. The projection zoom lens changes magnification by moving these moving lens groups. Further, the projection zoom lens satisfies conditional formulas (1) and (2) below:

$$d/fw<1.0 \quad (1),$$

$$1.5<fe/fw<7.0 \quad (2),$$

where, d: the distance between the most-reduction-side lens surface of the intermediate group and the most-reduction-side lens surface of the final lens group along the optical axis at the wide angle end, (Continued)

fw: the focal length of the entire system at the wide angle end, and fe: the focal length of the final lens group.

10 Claims, 14 Drawing Sheets

(56) References Cited

U.S. PATENT DOCUMENTS

| | | | |
|---|---|---|---|
| 4,995,707 | A | 2/1991 | Hashimoto |
| 5,600,490 | A | 2/1997 | Sugawara et al. |
| 5,654,826 | A | 8/1997 | Suzuki |
| 5,666,230 | A | 9/1997 | Tatsuno |
| 5,675,439 | A | 10/1997 | Nakatsuji |
| 5,917,658 | A | 6/1999 | Yamanashi |
| 2006/0280498 | A1 | 12/2006 | Souma et al. |
| 2009/0109548 | A1 | 4/2009 | Kimura |
| 2009/0135496 | A1* | 5/2009 | Nagahara ............... G02B 15/17 359/682 |
| 2011/0051257 | A1 | 3/2011 | Wada et al. |

FOREIGN PATENT DOCUMENTS

| | | |
|---|---|---|
| JP | 01-252914 | 10/1989 |
| JP | 02-236514 | 9/1990 |
| JP | 05-173070 | 7/1993 |
| JP | 07-120676 | 5/1995 |
| JP | 07-325272 | 12/1995 |
| JP | 08-234105 | 9/1996 |
| JP | 08-278445 | 10/1996 |
| JP | 2001-356381 | 12/2001 |
| JP | 2005-164839 | 6/2005 |
| JP | 2005-309061 | 11/2005 |
| JP | 2006-343554 | 12/2006 |
| JP | 2009-109630 | 5/2009 |
| JP | 2009-128683 | 6/2009 |
| JP | 2011-053295 | 3/2011 |
| JP | 2012-058607 | 3/2012 |

* cited by examiner

FIG.1
EXAMPLE 1
← MAGNIFICATION SIDE    REDUCTION SIDE →
WIDE ANGLE END
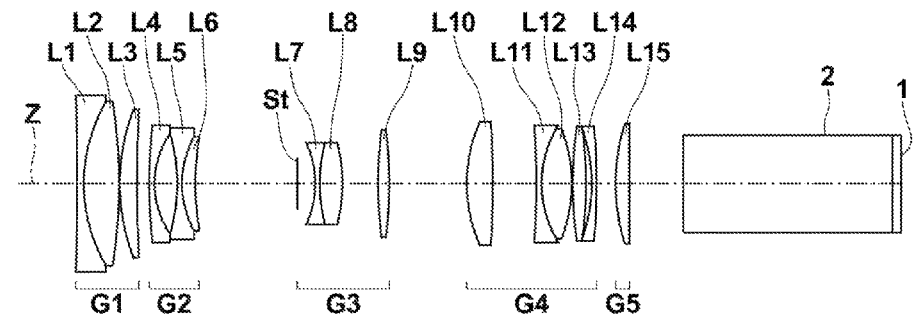
INTERMEDIATE
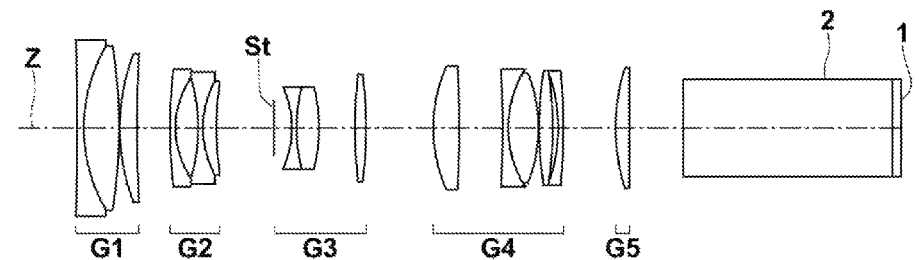
TELEPHOTO END
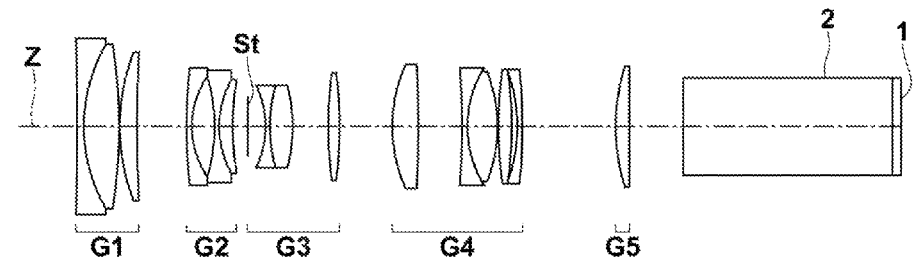

FIG.2
EXAMPLE 2
← MAGNIFICATION SIDE      REDUCTION SIDE →
WIDE ANGLE END
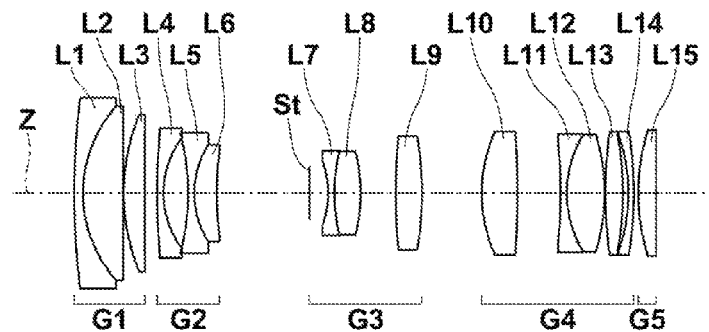
INTERMEDIATE
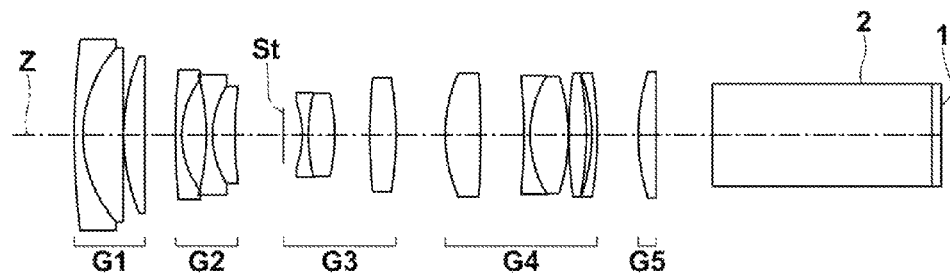
TELEPHOTO END
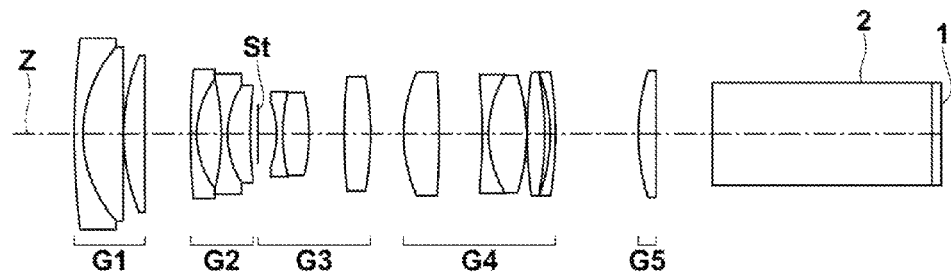

FIG.3
EXAMPLE 3
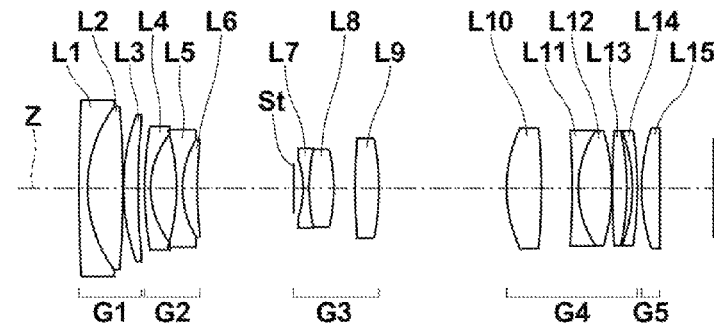
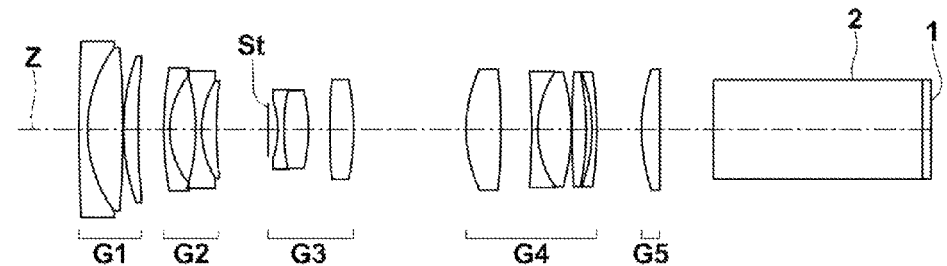
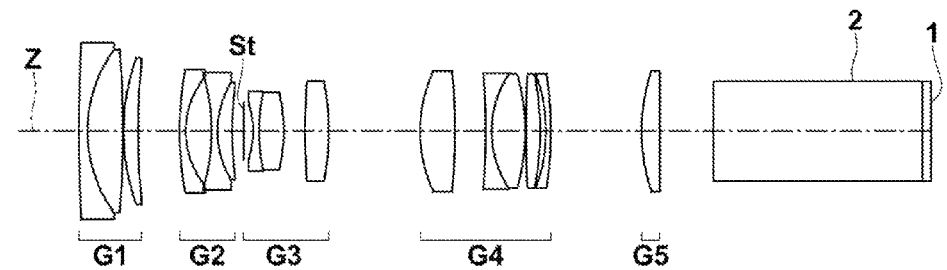

FIG.4
EXAMPLE 4
← MAGNIFICATION SIDE · REDUCTION SIDE →
WIDE ANGLE END
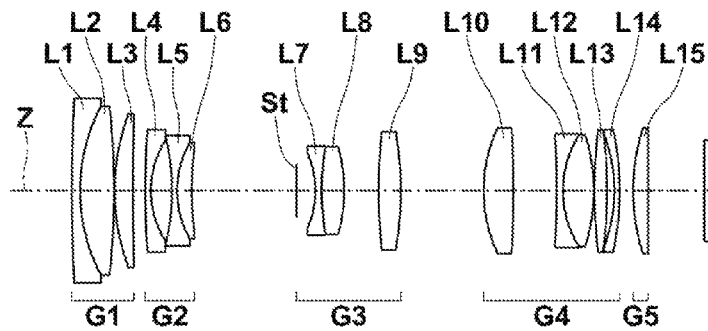
INTERMEDIATE
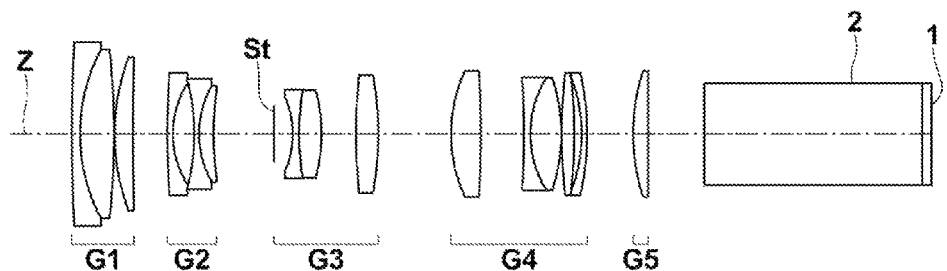
TELEPHOTO END
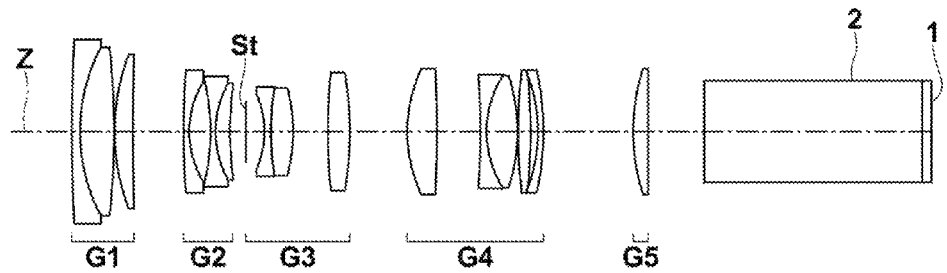

FIG.5
EXAMPLE 5
WIDE ANGLE END
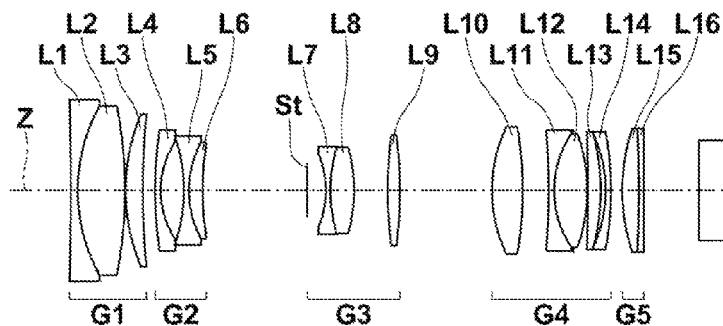
INTERMEDIATE
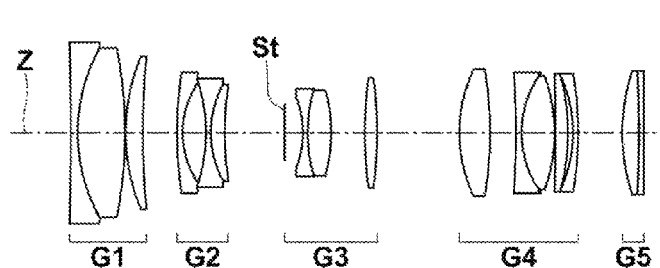
TELEPHOTO END
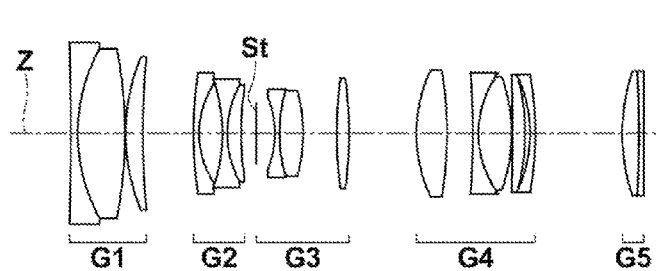

FIG.6
EXAMPLE 6
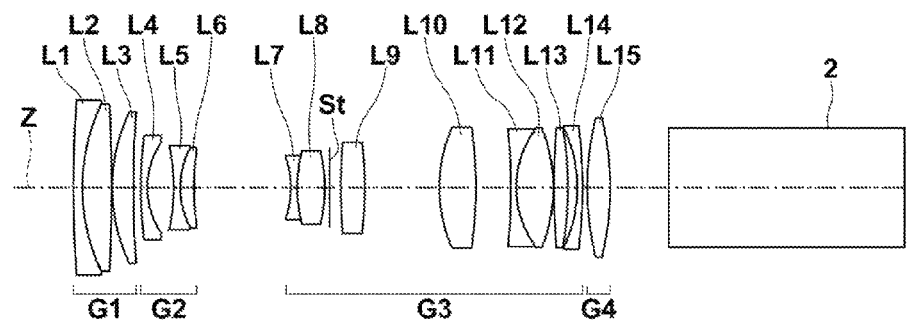
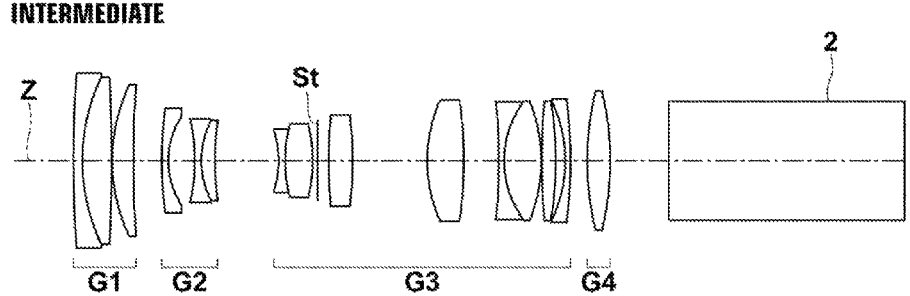
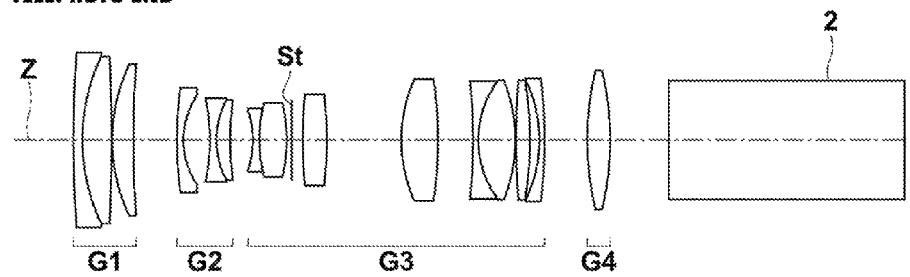

FIG.8
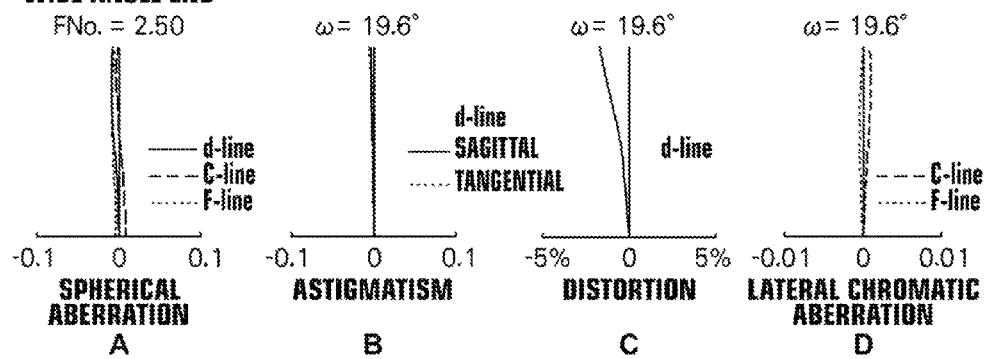
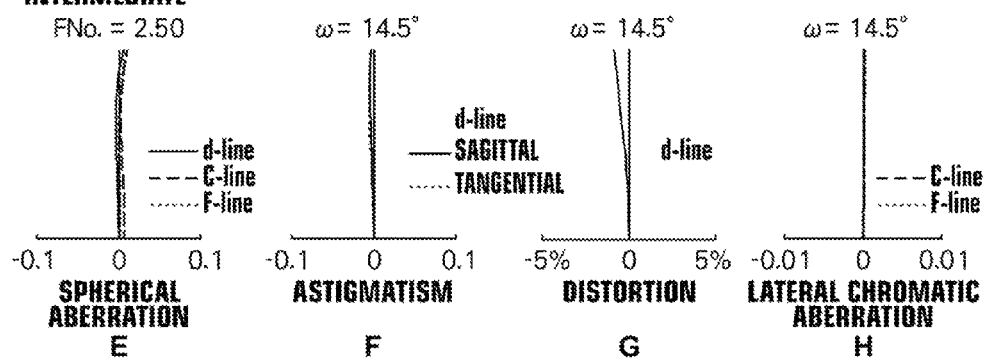
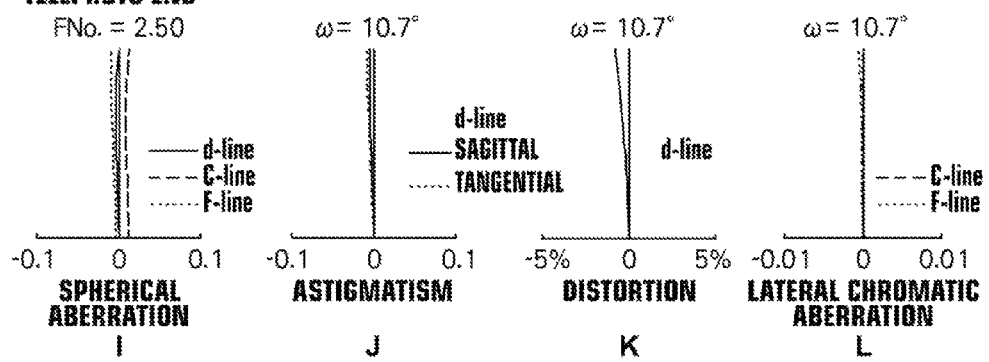

FIG.9
EXAMPLE 3
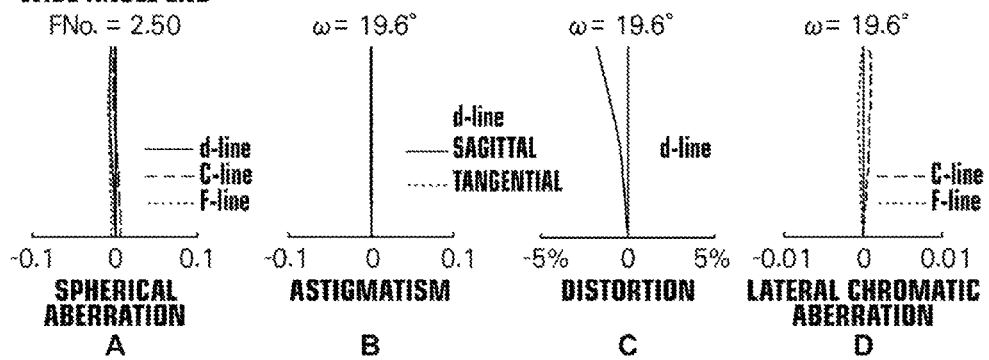
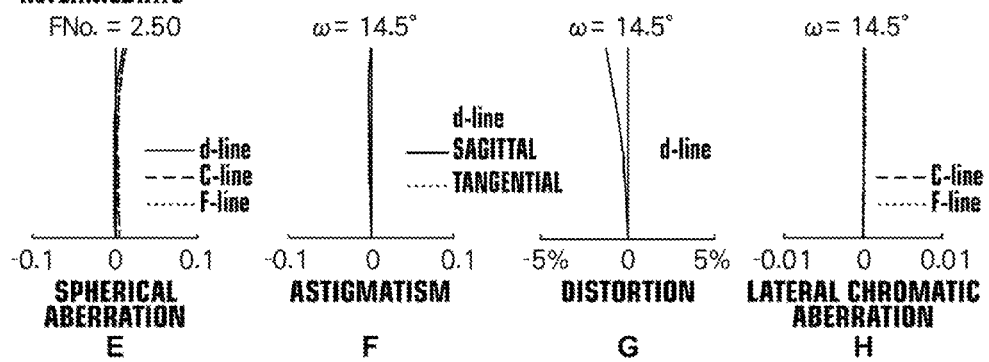
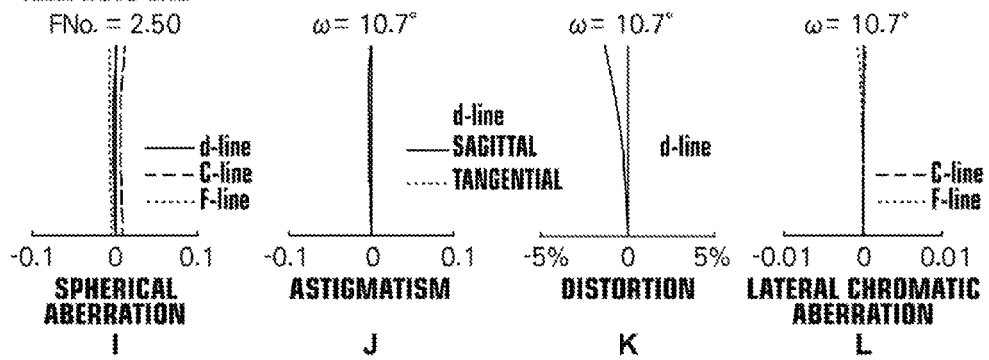

FIG.10
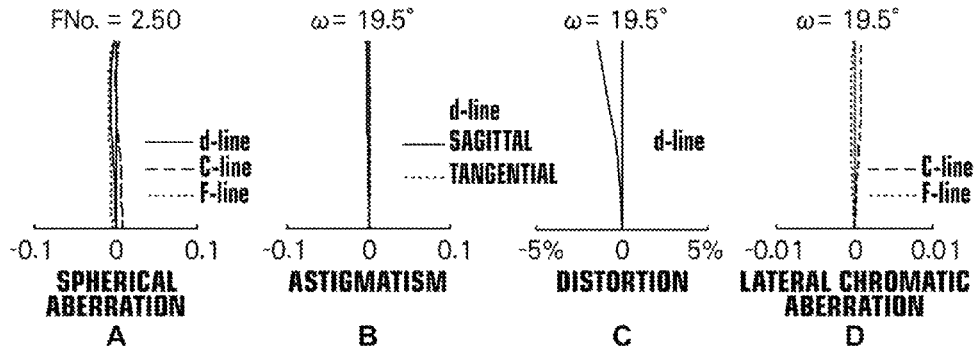
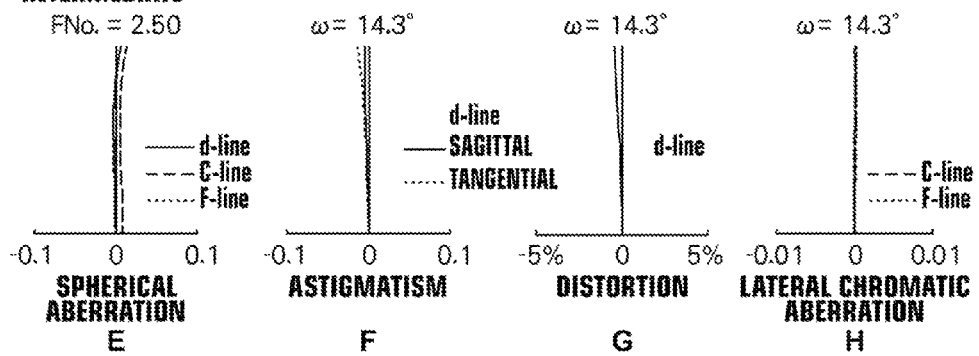
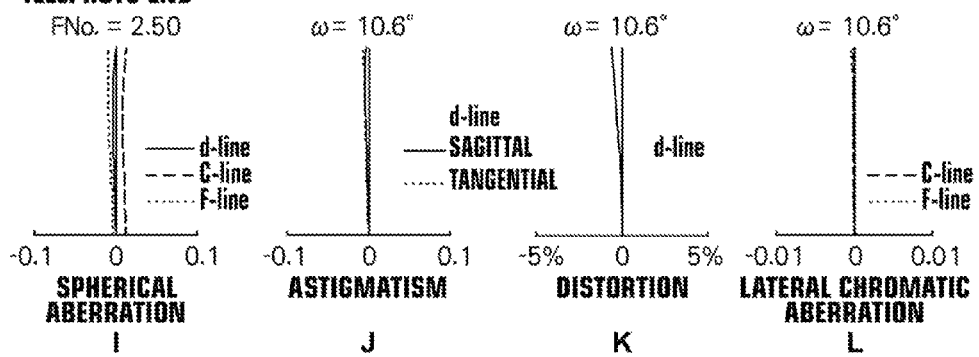

FIG.11

EXAMPLE 5

WIDE ANGLE END

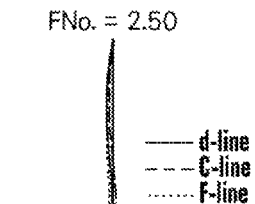
FNo. = 2.50
-0.1  0  0.1
SPHERICAL ABERRATION
d-line, C-line, F-line
A

ω = 19.5°
-0.1  0  0.1
ASTIGMATISM
d-line SAGITTAL, TANGENTIAL
B

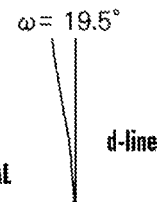
ω = 19.5°
-5%  0  5%
DISTORTION
d-line
C

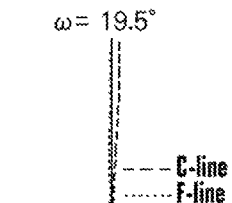
ω = 19.5°
-0.01  0  0.01
LATERAL CHROMATIC ABERRATION
C-line, F-line
D

INTERMEDIATE

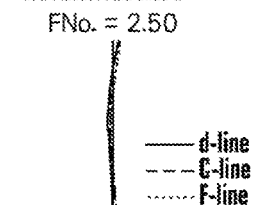
FNo. = 2.50
-0.1  0  0.1
SPHERICAL ABERRATION
d-line, C-line, F-line
E

ω = 14.3°
-0.1  0  0.1
ASTIGMATISM
d-line SAGITTAL, TANGENTIAL
F

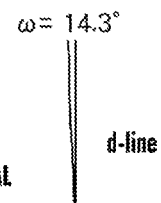
ω = 14.3°
-5%  0  5%
DISTORTION
d-line
G

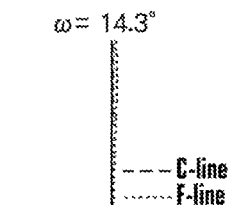
ω = 14.3°
-0.01  0  0.01
LATERAL CHROMATIC ABERRATION
C-line, F-line
H

TELEPHOTO END

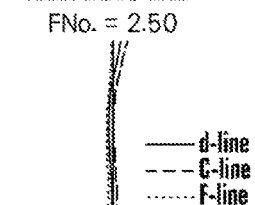
FNo. = 2.50
-0.1  0  0.1
SPHERICAL ABERRATION
d-line, C-line, F-line
I

ω = 10.6°
-0.1  0  0.1
ASTIGMATISM
d-line SAGITTAL, TANGENTIAL
J

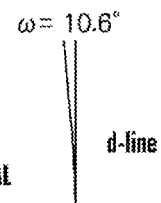
ω = 10.6°
-5%  0  5%
DISTORTION
d-line
K

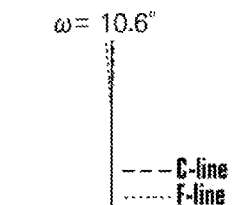
ω = 10.6°
-0.01  0  0.01
LATERAL CHROMATIC ABERRATION
C-line, F-line
L

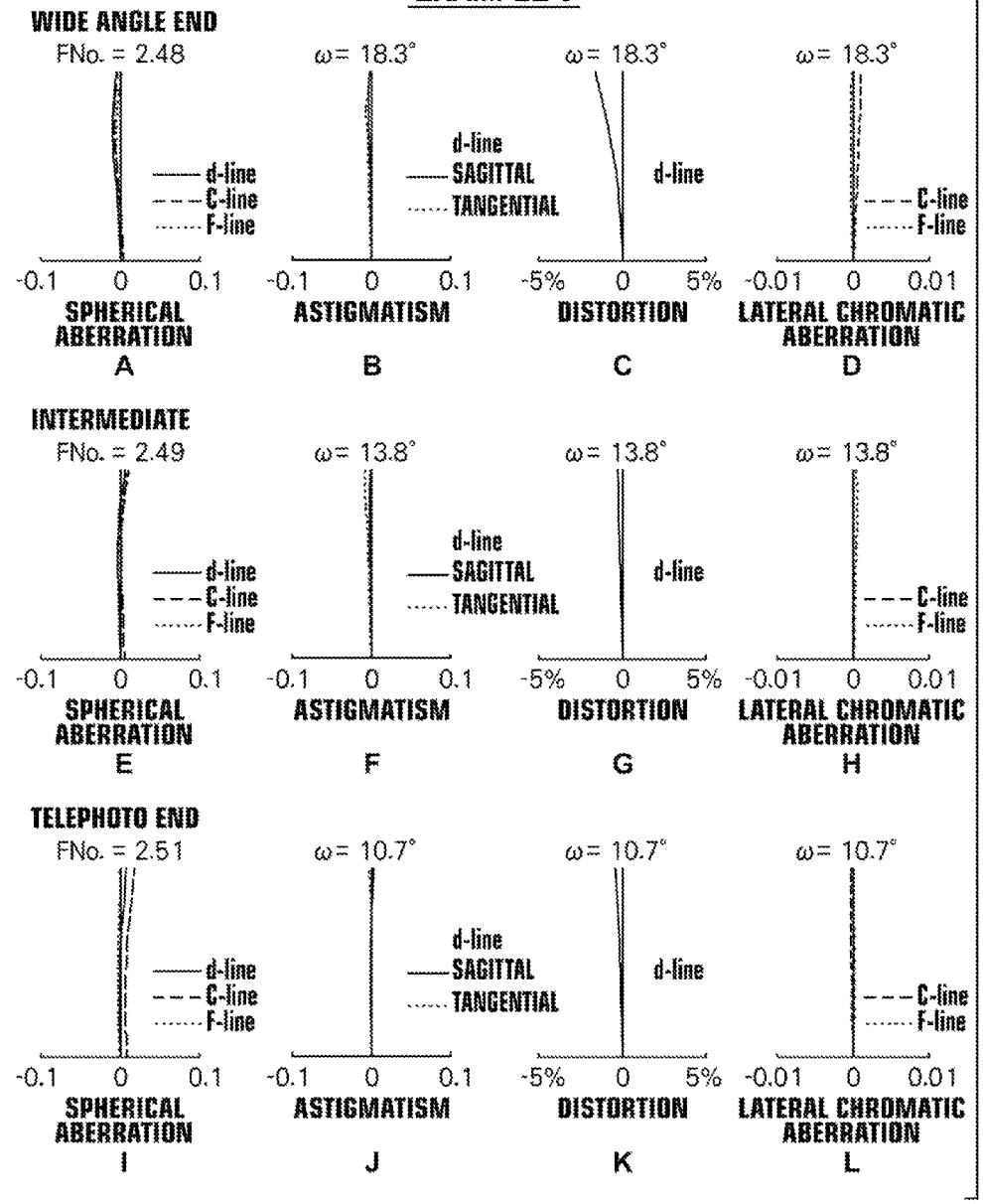

PROJECTION ZOOM LENS AND PROJECTION TYPE DISPLAY DEVICE

CROSS-REFERENCE TO RELATED APPLICATIONS

This application is a Continuation of PCT International Application No. PCT/JP2013/006719 filed on Nov. 15, 2013, which claims priority under 35 U.S.C. § 119(a) to Japanese Patent Application No. 2012-253319 filed on Nov. 19, 2012. Each of the above applications is hereby expressly incorporated by reference, in its entirety, into the present application.

BACKGROUND OF THE INVENTION

Technical Field

The present invention relates to a zoom lens, and particularly to a projection zoom lens to be applied to a projection type display device.

Further, the present invention relates to a projection type display device equipped with such a projection zoom lens.

Description of the Related Art

Conventionally, projection type display devices that utilize light valves, such as liquid crystal display elements, DMD's (Digital Micromirror Device: registered trademark), or the like have been widespread. Further, in recent years, movie theaters and the like have been using such projection type display devices, which are designed to be capable of being applied to large screens and of producing high-definition images.

Such projection type display devices to be utilized in movie theaters and the like as described above have been required to have long back focus and a favorable telecentricity. This is because such projection type display devices adopt a three-plate system in which three light valves for the respective primary colors are provided. In the three-plate system, a light beam from the light source is divided into three primary colors by a color separation optical system, and the separated light of the three colors passes through the respective light valves and then is composed by a color composition optical system to be projected.

Further, such projection type display devices to be utilized in movie theaters and the like have been required to be equipped with high zoom-ratio zoom lenses as a projection lens. This aims at fitting the size of display images to a screen size in accordance with the projector distances and screen sizes, which differ depending on movie theaters, halls, and in accordance with aspect ratios (cinema scope, Vista size) of display images.

Further, there are many cases that such projection zoom lenses are required to maintain constant numerical apertures (hereinafter, referred to as "F number(s)" as well) over the entire zoom range. This is because operating in such a manner can prevent the brightness of display images from changing when the zoom ratios of this type of zoom lens are changed to match the sizes described above.

Further, accompanying the rapid pace of digitalization of cinema screens, projection type display devices have been rapidly miniaturized and reduced in cost. There is likely to be also demand for projection zoom lenses to be miniaturized and reduced in cost in addition to the demands for back focus, telecentricity, and high zoom ratio.

Patent Documents 1 and 2 (Japanese Unexamined Patent Publication No. 2009-128683 and Japanese Unexamined Patent Publication No. 2012-058607) disclose projection zoom lenses which are intended for use in projection type display devices. More specifically, Patent Documents 1 and 2 disclose the projection zoom lens in which a first lens group having a positive refractive power positioned at the most-magnification side and a final lens group having a positive refractive power positioned at the most-reduction side are fixed while changing magnification, and a moving lens group as an intermediate group positioned between these lens groups is caused to move while changing magnification. In such projection zoom lenses, the numerical apertures are maintained constant over the entire zoom range.

Patent Documents 1 and 2 discloses projection zoom lenses that consist of a second lens group having a negative refractive power (hereinafter, referred to simply as a "negative" lens), a negative third lens group, and a positive fourth lens group as an example of the intermediate group mentioned above. Patent Document 2 also discloses a projection zoom lens in which an intermediate group consists of a negative second lens group and a positive third lens group. Patent Document 2 further discloses a projection zoom lens in which the intermediate group consists of a negative second lens group, a positive third lens group, and a positive fourth lens group and which fails to have the function of maintaining the numerical aperture constant.

SUMMARY OF THE INVENTION

However, in the projection zoom lenses disclosed in Patent Documents 1 and 2, the total length of the zoom lens and the diameters of lenses within the most-magnification-side lens group will increase when high zoom ratios are achieved. As a result, the demand for miniaturization cannot be satisfied. Further, increasing the total length and the diameters of lenses leads to increases in costs for optical systems. Thereby, the demand for reduction in costs cannot be satisfied.

The present invention has been developed in view of the above circumstances. It is an object of the present invention to provide a projection zoom lens that can secure a high zoom ratio and enables miniaturization and reduction in costs and to provide a projection type display device.

A projection zoom lens of the present invention essentially consisting of:

a first lens group having a positive refractive power that is positioned at the most-magnification side and is fixed while changing magnification;

a final lens group having a positive refractive power that is positioned at the most-reduction side and is fixed while changing magnification; and an intermediate group positioned between the first lens group and the final lens group, the intermediate group essentially consisting of two or three moving lens groups that move independently from each other along the optical axis while changing magnification, wherein the reduction side is telecentric, the most-magnification-side lens group of the intermediate group is a moving lens group having a negative refractive power, the most-reduction-side lens group of the intermediate group is a moving lens group having a positive refractive power, and the projection zoom lens satisfies conditional formula (1) below when the distance between the most-reduction-side lens surface of the intermediate group at the wide angle end and the most-reduction-side lens surface of the final lens group along the optical axis is d and the focal length of the entire system at the wide angle end is fw:

$$d/fw < 1.0 \qquad (1).$$

Here, the above expression "essentially consisting/consists of" intends to mean that lenses substantially without any power and optical elements other than lenses such as a stop, a cover glass, and the like in addition to the lens groups which are listed therein may be included. The same applies to the expression "essentially consisting/consists of" that is used for the arrangement of the other lens groups and lenses to be described later.

The above expression "reduction side is telecentric" refers to a state in which a line bisecting the angle formed by a ray having a maximum height in the upper side and a ray having a maximum height in the bottom side is nearly parallel to the optical axis in a cross section of a light beam which is focused on an arbitrary point on an image surface at the reduction side. The above expression is not limited to a case that the reduction side is completely telecentric, that is, the line bisecting the angle is completely parallel to the optical axis, but also refers to cases in which a certain degree of error is present. Here, the certain degree of error refers to a range of inclination between the bisecting angular line and the optical axis of ±3°.

Here, it is more desirable for the condition defined by conditional formula (1) described above to satisfy conditional formula (1') below:

$$d/fw<0.5 \tag{1'}$$

Further, it is desirable for the intermediate group described above to essentially consist of a moving lens group having a negative refractive power, a moving lens group having a negative refractive power and a moving lens group having a positive refractive power in this order from the magnification side.

Alternatively, the intermediate group described above may essentially consist of a moving lens group having a negative refractive power and a moving lens group having a positive refractive power in this order from the magnification side.

It is desirable for the projection zoom lens of the present invention to satisfy conditional formula (2) below when the focal length of the final lens group is fe and the focal length of the entire system at the wide angle end is fw:

$$1.5<fe/fw<7.0 \tag{2}$$

It is more desirable for the condition defined by conditional formula (2) to satisfy conditional formula (2') below:

$$2.0<fe/fw<5.0 \tag{2'}$$

It is desirable for the final lens group described above to essentially consist of two or less lenses.

In such a case, it is more desirable for the final lens group to essentially consist of one single lens having a positive refractive power.

It is desirable for the projection zoom lens of the present invention to satisfy conditional formula (3) below when the amount of movement of the most-reduction-side moving lens group of the intermediate group while changing magnification from the wide angle end to the telephoto end is m+, and the focal length of the entire system at the wide angle end is fw:

$$0.3<m+/fw \tag{3}$$

Here, it is more desirable for the condition defined by conditional formula (3) described above to satisfy conditional formula (3') below:

$$0.5<m+/fw \tag{3'}$$

It is desirable for the projection zoom lens of the present invention to satisfy conditional formula (4) below when the focal length of the first lens group is fl and the focal length of the entire system at the wide angle end is fw:

$$1.0<fl/fw<5.0 \tag{4}$$

It is more desirable for the condition defined by conditional formula (4) described above to satisfy conditional formula (4') below:

$$1.5<fl/fw<4.0 \tag{4'}$$

It is desirable for the projection zoom lens of the present invention to satisfy conditional formula (5) below when the back focus (air converted length) at the reduction side of the entire system at the wide angle end is Bf and the focal length of the entire system at the wide angle end is fw:

$$0.7<Bf/fw \tag{5}$$

It is more desirable for the condition defined by conditional formula (5) described above to satisfy conditional formula (5') below:

$$1.5<Bf/fw \tag{5'}$$

It is desirable for the projection zoom lens of the present invention to have an aperture stop positioned between adjacent moving lens groups or within one moving lens group in the intermediate group. It is also desirable for the aperture stop to be a variable stop that varies the aperture diameter such that the numerical aperture of the zoom lens is constant over the entire zoom range.

Note that the above expression "positioned . . . within one moving lens group" means not only that the aperture stop is positioned between the most-magnification-side lens and the most-reduction-side lens, but also that the aperture stop is positioned at the magnification side of the most-magnification-side lens or at the reduction side of the most-reduction-side lens.

Further, it is desirable for the projection zoom lens of the present invention to satisfy conditional formula (6) below when the zoom ratio of the telephoto end with respect to the wide angle end is Zr:

$$1.4<Zr \tag{6}$$

It is more desirable for the condition defined by conditional formula (6) described above to satisfy conditional formula (6') below:

$$1.6<Zr \tag{6}$$

The projection type display device according to the present invention includes a light source, a light valve into which light from the light source enters, and a projection zoom lens which projects an optical image formed by the light optically modulated by the light valve onto a screen. The projection zoom lens according to the present invention described above is applied as such a projection zoom lens.

The projection zoom lens of the present invention is configured to have an intermediate group that essentially consists of two or three moving lens groups positioned between the first lens group and the final lens group, both of which have positive refractive powers and are fixed while changing magnification. The projection zoom lens changes magnification by moving these moving lens groups. Further, the projection zoom lens satisfies conditional formula described above:

$$d/fw<1.0 \tag{1}$$

Such a configuration enables the projection zoom lens to secure a high zoom ratio and to be formed in a small size. In particular, in the case that the value of d/fw listed above is greater than or equal to 1.0, the diameters of lenses at the magnification side (the diameters of the most-magnification-side lens and the like within the first lens group) and the total length of the zoom lens will be likely to increase when achieving a high zoom ratio. In contrast, in the case that the value of d/fw falls below 1.0, such a problem can be avoided so that the projection zoom lens can be formed in a small size. Note that specific values of zoom ratios will be described with reference to the Examples to be described later.

The advantageous effects described above will become more prominent in the case that conditional formula below is satisfied within the range defined by conditional formula (1):

$$d/fw<0.5 \qquad (1').$$

Particularly in the case that the projection zoom lens of the present invention satisfies conditional formula (2) described above, the following advantageous effects can be obtained:

$$1.5<fe/fw<7.0 \qquad (2).$$

In particular, when the value of fe/fw is less than or equal to 1.5, it will become difficult to correct spherical aberration. Further, the diameters of lenses at the magnification side will increase, resulting in the zoom lens being likely to become large. However, when the value of fe/fw exceeds 1.5, such a problem can be avoided so that spherical aberration can be corrected favorably. Further, the diameters of lenses at the magnification side can be reduced so that the zoom lens can be formed in a small size. Further, the value of fe/fw is greater than or equal to 7.0, spherical aberration at the telephoto end will be likely to increase. However, when the value of fe/fw falls below 7.0, such a problem can be avoided so that spherical aberration at the telephoto end can be reduced.

The advantageous effect described above will become more prominent in the case that conditional formula below is satisfied within the range defined by conditional formula (2):

$$2.0<fe/fw<5.0 \qquad (2').$$

Particularly in the case that the projection zoom lens of the present invention satisfies conditional formula (3) described above, the following advantageous effects can be obtained:

$$0.3<m+/fw \qquad (3).$$

In particular, when the value of m+/fw is less than or equal to 0.3, the diameters of lenses at the magnification side and the total length of the zoom lens will be likely to increase. In contrast, when the value of m+/fw falls below 0.3, such a problem can be avoided so that the zoom lens can be formed in a small size.

The advantageous effects described above will become more prominent in the case that conditional formula below is satisfied within the range defined by conditional formula (3):

$$0.5<m+/fw \qquad (3').$$

Further, particularly in the case that the projection zoom lens of the present invention satisfies conditional formula (4) described above, the following advantageous effects can be obtained:

$$1.0<fl/fw<5.0 \qquad (4).$$

In particular, when the value of fl/fw is less than or equal to 1.0, it will become difficult to correct spherical aberration. In contrast, when the value of fl/fw exceeds 1.0, such a problem can be avoided so that spherical aberration can be corrected favorably. When the value of fl/fw is greater than or equal to 5.0, it will become difficult to correct longitudinal chromatic aberration. Further, the diameters of lenses at the magnification side will be likely to increase. Such a problem, however, can be avoided when the value of fl/fw falls below 5.0, thereby correcting longitudinal chromatic aberration easily. As a result, the diameters of lenses at the magnification side can be reduced.

The advantageous effects described above will become more prominent in the case that conditional formula below is satisfied within the range defined by conditional formula (4):

$$1.5<fl/fw<4.0 \qquad (4').$$

Particularly in the case that the projection zoom lens of the present invention satisfies conditional formula (5) described above, the following advantageous effects can be obtained:

$$0.7<Bf/fw \qquad (5).$$

In particular, when the value of Bf/fw is less than or equal to 0.7, the back focus will become short. This makes it difficult to dispose a prism within the zoom lens. However, when the value of Bf/fw exceeds 0.7, such a prism will be easily disposed therewithin.

The advantageous effects described above will become more prominent in the case that conditional formula below is satisfied within the range defined by conditional formula (5):

$$1.5<Bf/fw \qquad (5').$$

Particularly in the case that the projection zoom lens of the present invention satisfies conditional formula (6) described above, a high zoom ratio can be secured and the range in which the projection zoom lens can be used can be widened:

$$1.4<Zr \qquad (6).$$

The advantageous effects described above will become more prominent in the case that conditional formula below is satisfied within the range defined by conditional formula (6):

$$1.6<Zr \qquad (6').$$

Note that there is generally demand for zoom lenses which are applied to projection type display devices utilized in movie theaters, and the like to have F numbers of less than 3.0 (which is bright) over the entire zoom range. The projection zoom lenses of the present invention are capable of fulfilling such a demand. Specific numerical values thereof will be described later with reference to Examples.

Further, there is generally demand for the projection type display devices as described above to suppress distortion to within approximately 2% over the entire zoom range. The projection zoom lenses of the present invention are capable of fulfilling such a demand. Specific numerical values thereof will be described later with reference to the Examples.

The projection type display device of the present invention employs the zoom lenses of the present invention as described above as a projection zoom lens. Accordingly, a high zoom ratio can be secured and the projection zoom lens can be formed in a small size.

BRIEF DESCRIPTION OF THE DRAWINGS

FIG. 1 is a collection of cross-sectional views of a projection zoom lens according to Example 1 of the present invention, illustrating the lens configuration thereof.

FIG. 2 is a collection of cross-sectional views of a projection zoom lens according to Example 2 of the present invention, illustrating the lens configuration thereof.

FIG. 3 is a collection of cross-sectional views of a projection zoom lens according to Example 3 of the present invention, illustrating the lens configuration thereof.

FIG. 4 is a collection of cross-sectional views of a projection zoom lens according to Example 4 of the present invention, illustrating the lens configuration thereof.

FIG. 5 is a collection of cross-sectional views of a projection zoom lens according to Example 5 of the present invention, illustrating the lens configuration thereof.

FIG. 6 is a collection of cross-sectional views of a projection zoom lens according to Example 6 of the present invention, illustrating the lens configuration thereof.

FIG. 8 shows aberration diagrams (A) through (L) of the projection zoom lens according to the above Example 2.

FIG. 9 shows aberration diagrams (A) through (L) of the projection zoom lens according to the above Example 3.

FIG. 10 shows aberration diagrams (A) through (L) of the projection zoom lens according to the above Example 4.

FIG. 11 shows aberration diagrams (A) through (L) of the projection zoom lens according to the above Example 5.

FIG. 12 shows aberration diagrams (A) through (L) of the projection zoom lens according to the above Example 6.

DESCRIPTION OF THE PREFERRED EMBODIMENTS

Figure 7:
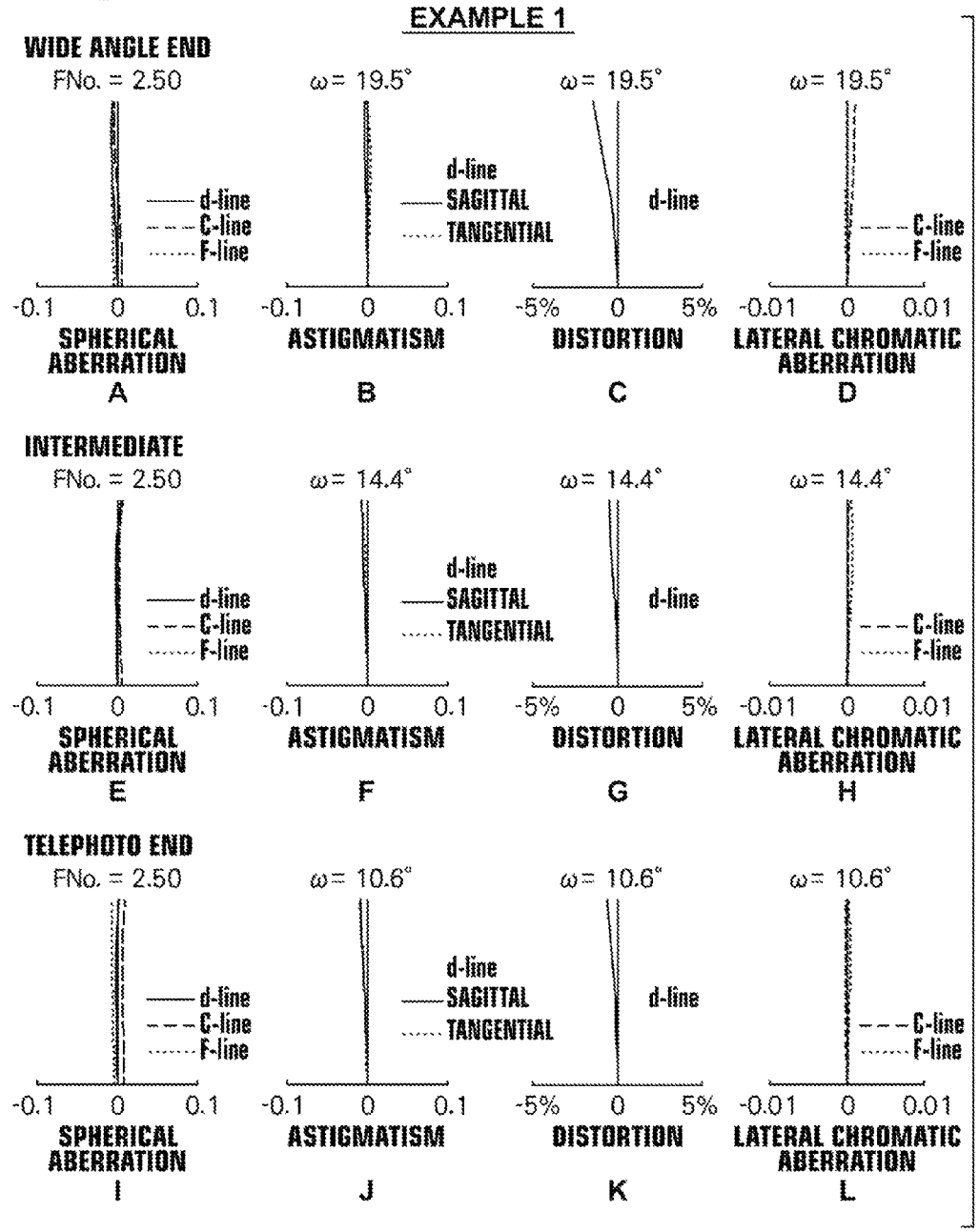
FIG. 7 shows aberration diagrams (A) through (L) of the projection zoom lens according to the above Example 1.

Hereinafter, embodiments of the present invention will be described in detail with reference to the accompanying drawings. First, a projection zoom lens according to one embodiment of the present invention will be described with reference to FIG. 1. FIG. 1 illustrates moving positions of the lens groups from the wide angle end, the telephoto end, and the intermediate position therebetween when the projection zoom lens according to Example 1 of the present invention is operated to change magnification. The manner, in which the configuration is shown, is the same as those in FIGS. 1 through 6.

FIGS. 2 through 6 are cross-sectional views illustrating examples of other configurations according to the embodiments of the present invention, corresponding to projection zoom lenses according to Examples 2 through 6 to be described later. Among these projection zoom lenses, the projection zoom lenses according to Examples 1 through 5 are of a five-group configuration, and the projection zoom lens according to Example 6 is of a four-group configuration.

Embodiment of a Five-Group Configuration

At first, the projection zoom lenses of a five-group configuration according to Examples 1 through 5 will be described. However, these projection zoom lenses have the same basic configurations as for Example 1 except particularly described portions. Therefore, the embodiment will be described below mainly with reference to the configuration illustrated in FIG. 1 as an example.

The projection zoom lens of the present embodiment can be mounted on projection type display devices utilized in movie theaters, and the like to produce digital images. For example, the projection zoom lens of the present embodiments can be used as a projection lens which projects image information displayed on a light valve onto a screen. In FIG. 1, the left side is designated as the magnification side and the right side is designated as the reduction side. Further, supposing a case that the projection zoom lens is mounted on the projection type display devices, FIG. 1 also shows glass blocks 2, 1, such as a color combining prism (which includes a filter and the like). This applies to FIGS. 2 through 5 below in the same manner as FIG. 1. Note that an image display surface of the light valve lies on the reduction-side surface of the glass block 1, for example.

In the projection type display device, a light beam, which has been provided with image information at the image display surface above, enters the projection zoom lens via the glass blocks 2, 1. Then, the projection zoom lens enlarges and projects images onto a screen (not shown) disposed toward the leftward direction in the Figure.

According to the description above, FIG. 1 shows an example in which the position of the reduction-side surface of the glass block 2 matches the position of the image display surface. The projection zoom lens of the present invention, however, is not necessarily limited to such a configuration. Further, according to the description above, only one image display surface is provided with the projection type display device. However, the projection type display device may be configured to have a color separation optical system to separate the light beam from the light source into the three primary colors and to include three light valves which respectively correspond to the three primary colors so that full color images can be displayed.

The projection zoom lens according to the present embodiment consists of a first lens group G1 having a positive refractive power, a second lens group G2 having a negative refractive power, a third lens group G3 having a negative refractive power, a fourth lens group G4 having a positive refractive power, and a fifth lens group G5 having a positive refractive power as substantial lens groups. The first lens group G1 is disposed at the most-magnification side and fixed while changing magnification, and the second lens group G2 is positioned next to this first lens group at the reduction side and moves while changing magnification. The third lens group G3 is disposed next to this second lens group G2 at the reduction side and moves while changing magnification, and the fourth lens group G4 is disposed next to this third lens group G3 at the reduction side and moves while changing magnification. The fifth lens group G5 is disposed at the most-reduction side and fixed while changing magnification. Further, the projection zoom lens is configured to be telecentric at the reduction side. The configurations of the lens groups described above are the same for Examples 1 through 5. In the present embodiment, the second lens group G2 through the fourth lens group G4 constitute the intermediate group in the present invention.

Further, this projection zoom lens is configured to perform focusing by moving the first lens group G1.

In this projection zoom lens, the first lens group G1 consists of three lenses (the first lens L1 through the third lens L3), and the second lens group G2 consist of three lenses (the fourth lens L4 through the sixth lens L6). The third lens group G3 consists of three lenses (the seventh lens L7 through the ninth lens L9) and the aperture stop St positioned at the most-magnification side. The fourth lens group G4 consists of five lenses (the tenth lens L10 through the fourteenth lens L14), and the fifth lens group G5 consists of one lens (the fifteenth lens L15).

However, the number of lenses that constitute each lens group of the projection zoom lens is not necessarily limited to the example of FIG. 1.

In the projection zoom lens of the present embodiment, the aperture stop St positioned within the third lens group G3 is a variable stop that varies the aperture diameter such that the numerical aperture of the zoom lens is maintained constant over the entire zoom range. This applies to Examples 1 through 5.

Further, this projection zoom lens satisfies conditional formula (1) below when the distance between the most-reduction-side lens surface (the reduction-side lens surface of the fourteenth lens L14) of the intermediate group at the wide angle end and the most-reduction-side lens surface (the reduction-side lens surface of the fifteenth lens L15) of the final lens group at the wide angle end along the optical axis Z is d, and the focal length of the entire system at the wide angle end is fw:

$$d/fw<1.0 \tag{1}$$

Note that Table 13 shows a collection of the values of the conditions (the equations) defined by this conditional formula (1) and the other conditional formulas (2) through (6) for each Example. Further, Table 14 shows the values of the other main conditions. In this Table 14, the signs "f2", "f3", and "f4" respectively refer to the focal lengths of the second lens group, the third lens group, and the fourth lens group which are moving lens groups that constitute the intermediate group. In Example 6, the fourth lens group as a moving lens group does not exist.

As conditional formula (1) is satisfied in such a manner, the projection zoom lens of the present embodiment can secure a high zoom ratio and can be formed in a small size. The detailed reason therefor has already been given.

Further, as the projection zoom lens of the present embodiment satisfies conditional formula (1') described above within the range defined by conditional formula (1), the advantageous effects described above will become more prominent.

Further, the projection zoom lens of the present embodiment satisfies conditional formula (2) below when the focal length of the final lens group G5 is fe and the focal length of the entire system at the wide angle end is fw:

$$1.5<fe/fw<7.0 \tag{2}$$

Thereby, spherical aberration can be corrected favorably. Further, the diameters of lenses at the magnification side will be reduced, and thereby the zoom lens can be formed in a small size. Moreover, spherical aberration at the telephoto end can be suppressed. The detailed reason therefor has already been given.

Further, as the projection zoom lens of the present embodiment satisfies conditional formula (2') described above within the range defined by conditional formula (2), the advantageous effects described above will become more prominent.

Further, the projection zoom lens of the present embodiment satisfies conditional formula (3) below when the amount of movement of the most-reduction-side moving lens group (the fourth lens group G4) among the intermediate group while changing magnification from the wide angle end to the telephoto end is m+, and the focal length of the entire system at the wide angle end is fw:

$$0.3<m+/fw \tag{3}$$

Thereby, the zoom lens can be miniaturized. The detailed reason therefor has already been given.

Further, as the projection zoom lens of the present embodiment satisfies conditional formula (3') described above within the range defined by conditional formula (3), the advantageous effects described above will become more prominent.

The projection zoom lens of the present embodiment satisfies conditional formula (4) below when the focal length of the first lens group G1 is f1 and the focal length of the entire system at the wide angle end is fw:

$$1.0<f1/fw<5.0 \tag{4}$$

Thereby, spherical aberration can be corrected favorably. In addition thereto, longitudinal chromatic aberration can be easily corrected and the diameters of lenses at the magnification side can be reduced. The detailed reason therefor has already been given.

As the projection zoom lens of the present embodiment satisfies conditional formula (4') described above within the range defined by conditional formula (4), the advantageous effects described above will become more prominent.

Further, the projection zoom lens of the present embodiment satisfies conditional formula (5) below when the back focus (air converted length) at the reduction side of the entire system at the wide angle end is Bf and the focal length of the entire system at the wide angle end is fw:

$$0.7<Bf/fw \tag{5}$$

Thereby, the prism as described above can be easily disposed within the lens system. The detailed reason therefor has already been given.

Further, the projection zoom lens of the present embodiment satisfies conditional formula (5') described above within the range defined by conditional formula (5), the advantageous effects described above will become more prominent.

Further, the projection zoom lens of the present embodiment satisfies conditional formula (6) below when the zoom ratio of the telephoto end with respect to the wide angle end is Zr:

$$1.4<Zr \tag{6}$$

Thereby, a high zoom ratio can be secured and the range, in which the projection zoom lens is used, can be widened.

Further, the projection zoom lens of the present embodiment satisfies conditional formula (6') described above within the range defined by conditional formula (6), the advantageous effects described above will become more prominent.

Embodiment of a Four-Group Configuration

Next, the projection zoom lens of a four-group configuration in the present embodiment will be described with reference to FIG. 6. The projection zoom lens of FIG. 6 corresponds to the projection zoom lens of the sixth embodiment to be described later.

The projection zoom lens according to the present embodiment consists of a first lens group G1 having a positive refractive power, a second lens group G2 having a negative refractive power, a third lens group G3 having a positive refractive power, and a fourth lens group G4 having a positive refractive power as substantial lens groups. The first lens group G1 is disposed at the most-magnification side and fixed while changing magnification, and the second lens group G2 is positioned next to this first lens group at the reduction side and moves while changing magnification. The third lens group G3 is disposed next to this second lens group G2 at the reduction side and moves while changing magnification, and the fourth lens group G4 is disposed next to this third lens group G3 at the reduction side and fixed while changing magnification. Further, the projection zoom lens is configured to be telecentric at the reduction side. In the present embodiment, the second lens group G2 and the third lens group G3 constitute the intermediate group in the present invention.

In this projection zoom lens, the first lens group G1 essentially consists of three lenses (the first lens L1 through the third lens L3), and the second lens group G2 essentially consists of three lenses (the fourth lens L4 through the sixth lens L6). Further, the third lens group G3 essentially consists of eight lenses (the seventh lens L7 through the fourteenth lens L14) and the aperture stop St. The fourth lens group G4 which is a final lens group essentially consists of one lens (the fifteenth lens L15). In this case, the number of lenses that constitutes each lens group is not necessarily limited to that of the example shown in FIG. 6.

Note that the aperture diameter of the aperture stop St is maintained constant in the present embodiment. The numerical aperture of the zoom lens therefore varies accompanying changes in magnification.

The projection zoom lens of the embodiment satisfies all of conditional formulas (1) through (6) above and conditional formulas (1'), (2'), (4') through (6') as well. The advantageous effects obtained thereby is the same as those described above.

Figure 13:
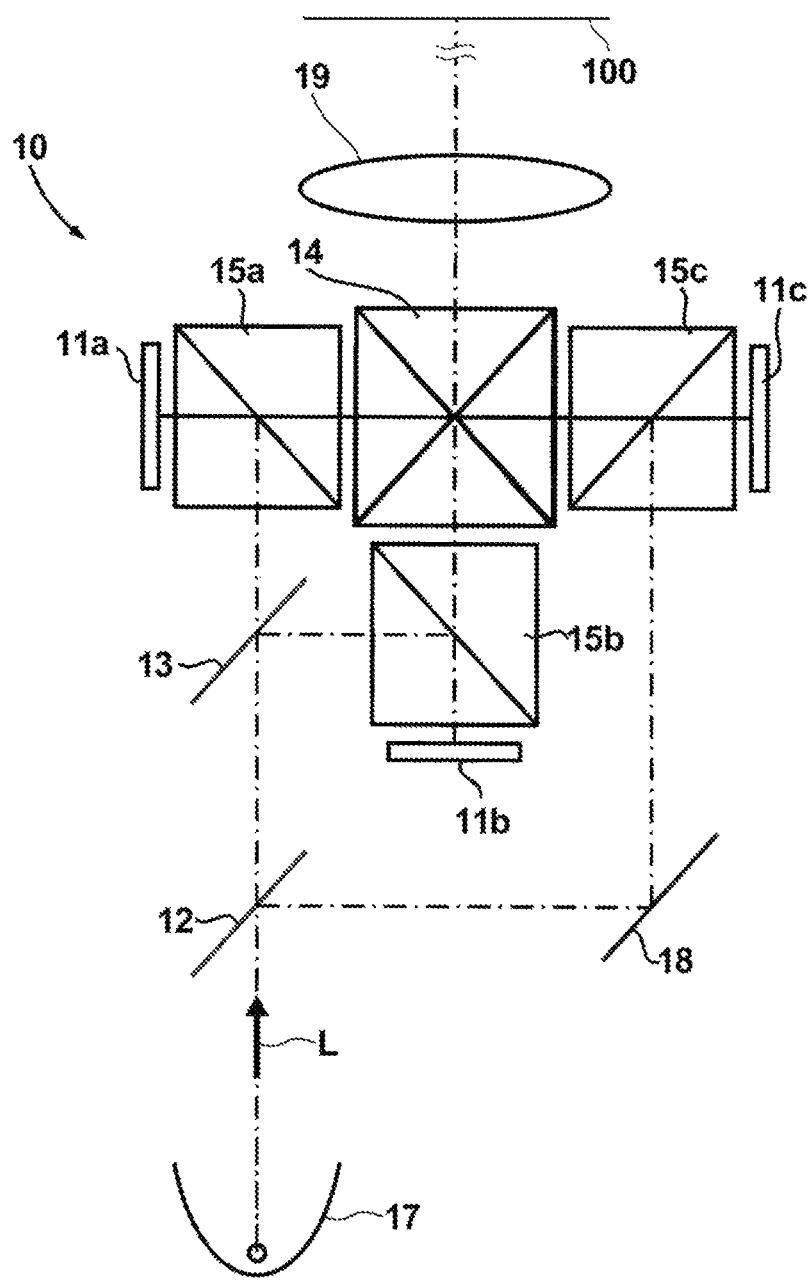
FIG. 13 is a schematic configuration diagram of a projection type display device according to an embodiment of the present invention.

Next, the embodiment of the projection type display device according to the present invention will be described with reference to FIGS. 13 and 14. FIG. 13 is a schematic configuration diagram of a part of a projection type display device according to one embodiment of the present invention. The projection type display device illustrated in FIG. 13 includes an illumination optical system 10. The illumination optical system 10 includes reflection type display elements 11a through 11c as light valves respectively corresponding to the colored light beams, dichroic mirrors 12, 13 for color separation, a cross dichroic prism 14 for combining colors, a total reflection mirror 18 for deflecting optical paths, and polarized light separation prisms 15a through 15c. Note that a light source 17 which emits a white light beam L is disposed in the front of the dichroic mirror 12.

A white light beam L emitted from the light source 17 is separated into three colored light (G light, B light, and R light) by the dichroic mirrors 12, 13. The separated colored light beams respectively enter the reflection type display elements 11a through 11c corresponding thereto to be optically modulated, via the polarized light separation prisms 15a through 15c. The optically modulated light beams are subjected to the color composition by the cross dichroic prism 14, and then enters the projection zoom lens 19 according to the embodiment of the present invention. Then, optical images formed by the entered light are projected onto a screen 100 by the projection zoom lens 19.

Figure 14:
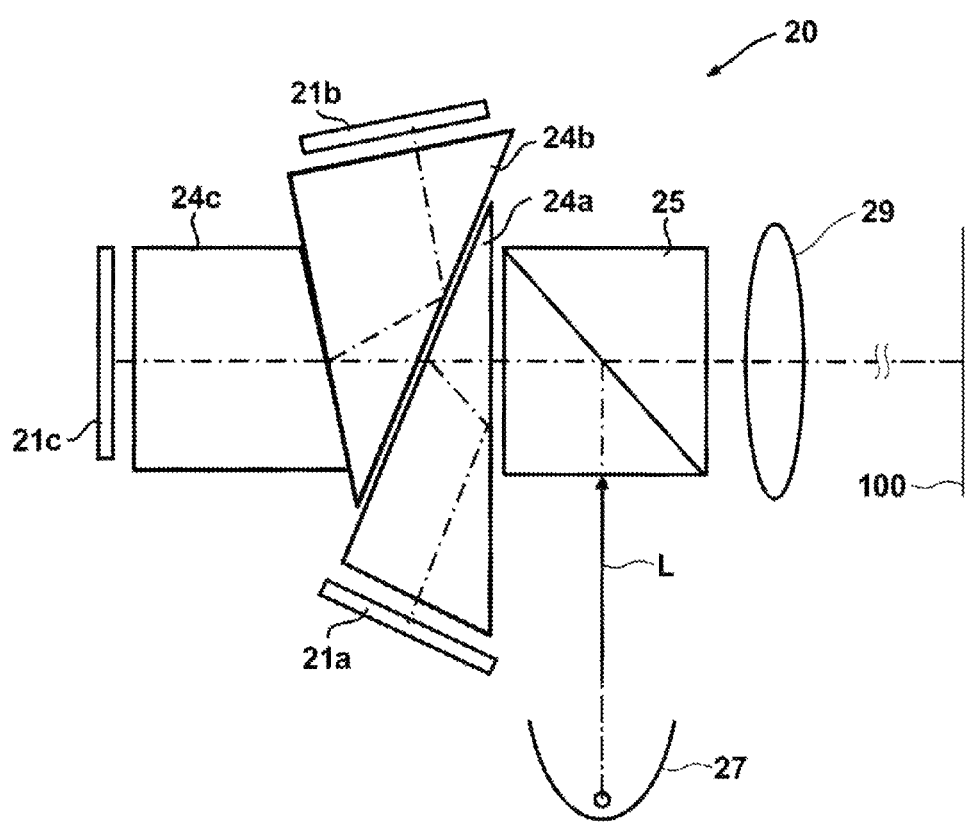
FIG. 14 is a schematic configuration diagram of a projection type display device according to another embodiment of the present invention.

Next, FIG. 14 is a schematic configuration diagram of a part of a projection type display device according to another embodiment of the present invention. The projection type display device illustrated in FIG. 14 includes an illumination optical system 20. The illumination optical system 20 includes reflection type display elements 21a through 21c as light valves respectively corresponding to the colored light beams, TIR (Total Internal Reflection) prisms 24a through 24c for a color separation and color composition, and a polarized light separation prism 25. Note that a light source 27 which emits a white light beam L is disposed in the front of the polarized light separation prism 25.

A white light beam emitted from the light source 27 passes through the polarized light separation prism 25, and then is separated into three colored light (G light, B light, and R light) by the TIR prisms 24a through 24c. The separated colored light beams respectively enter the reflection type display elements 21a through 21c corresponding thereto to be optically modulated. The optically modulated light beams travel again through the TIR prism 24a through 24c in the opposite direction to be combined, and then are transmitted through the polarized light separation prism 25 to enter the projection zoom lens 29 according to the embodiment of the present invention. Then, optical images formed by the entered light are projected onto a screen 100 by the projection zoom lens 29.

Note that the reflection type display elements 11a through 11c and 21a through 21c may be reflection type liquid crystal display elements, DMD's, or the like, for example. Although FIGS. 13 and 14 show examples in which the reflection type display elements are utilized as light valves, the light valves included in the projection type display device of the present invention are not limited to these elements, and transmissive display elements such as transmissive type liquid crystal display elements and the like may be employed.

Next, specific Examples of the projection zoom lens of the present invention will be described. Note that the projection zoom lenses of Examples 1 through 5 to be described later are of a five-group configuration. The projection zoom lens of Example 6 is of a four-group configuration.

EXAMPLE 1

FIG. 1 illustrates the arrangement of the lens groups of the projection zoom lens of Example 1 at each of the wide angle end, the telephoto end, and the intermediate position therebetween. Note that since the detailed descriptions of FIG. 1 has already been given, redundant descriptions will be omitted unless particularly necessary.

In the projection zoom lens of this Example 1, the first lens group G1 consists of three lenses: a first lens L1 having a negative refractive power (hereinafter, a lens having a positive or negative refractive power will be simply referred to as a "positive" or "negative" lens), a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other, and the fifth lens L5 and the sixth lens L6 are cemented to each other. Further, the eleventh lens L11 and the twelfth lens L12 are cemented to each other as well.

Table 1 shows basic lens data of the projection zoom lens of Example 1. The glass blocks 2, 1 are also shown therein. In Table 1, i-th (i=1, 2, 3, . . . ) surface numbers, the value of i sequentially increasing from the surface of the constituent element at the most-magnification side, which is designated as 1, toward the reduction side, are shown in the column Si. The radii of curvature of i-th surfaces are shown in the column Ri, and distances between i-th surfaces and (i+1)th surfaces along the optical axis Z are shown in the column Di. Further, the refractive indices of j-th (j=1, 2, 3, . . . ) constituent elements with respect to the d-line (wavelength: 587.6 nm), the value of j sequentially increasing from the constituent element at the most magnification side, which is designated as 1, toward the reduction side, are shown in the column Ndj. The Abbe numbers of j-th constituent elements with respect to the d-line are shown in the column vdj.

Note that the values of the radius of curvature R and the distance between surfaces D shown in Table 1 are normalized such that the focal length of the entire system of the projection zoom lens at the wide angle end becomes 10.00. The numerical values in Table 1 are rounded to a predetermined number of digits. The sign of the radius of curvature is positive in the case that a surface shape is convex on the magnification side, and negative in the case that the surface shape is convex on the reduction side.

Among the distances between surfaces D, the distance between the first lens group G1 and the second lens group G2, the distance between the second lens group G2 and the third lens group G3, the distance between the third lens group G3 and the fourth lens group G4, and the distance between the fourth lens group G4 and the fifth lens group G5 are variable distances that vary while changing magnification. DD 5, DD 10, DD 17, and DD 26, which are respectively represented by indicating "DD" with the surface number of the frontward surface from which the distance is measured, are respectively shown in the spaces of the distance between surfaces corresponding to these distances.

The same as described above applies to Tables 3, 5, 7, 9, and 11 to be described later. Regarding the distances between variable lens groups as listed above, the numbers that follow "DD" change according to the number of the constituent elements in each of the Examples. However, each of the distances between the variable lens groups is represented by indicating the surface number of the frontward surface from which the distance is measured in the same manner in all of the Tables.

Table 2 shows the values of the focal length f of the entire system, back focus Bf, the variable distances DD5, DD10, DD17, and DD26, and the stop diameter of the aperture stop St (which refers to the aperture diameter: the diameter) at each of the wide angle end, an intermediate position, and the telephoto end while changing magnification in the project zoom lens of Example 1. These numerical values are also normalized such that the focal length of the entire system at the wide angle end is 10.00. In addition, these numerical values are for when the projection distance is infinity.

Table 2 also shows the zoom ratios (a zoom ratio at the wide angle end is 1.00), the F numbers (numerical aperture) Fno., and the full angle of view 2ω (the unit is a degree) of the zoom lens of Example 1. The values of the F numbers are maintained at a constant value of 2.5, which is sufficiently smaller than 3.0 described above, at the wide angle end, the intermediate position, and the telephoto end. The same applies to Examples 2 through 5 to be described below.

The manner, in which Table 2 is shown as described above, is the same as those of Tables 4, 6, 8, 10, and 12.

TABLE 1

Example 1: Basic Lens Data

| Si Surface Number | Ri Radius of Curvature | Di Distance Between Surfaces | Ndj Refractive Index | vdj Abbe Number |
|---|---|---|---|---|
| 1 | −308.9615 | 0.685 | 1.80518 | 25.42 |
| 2 | 17.4931 | 3.669 | 1.72047 | 34.71 |
| 3 | −55.4171 | 0.062 | | |
| 4 | 22.1462 | 1.813 | 1.77250 | 49.60 |
| 5 | 196.1507 | DD[5] | | |
| 6 | 54.9244 | 0.558 | 1.61800 | 63.33 |
| 7 | 9.4940 | 2.361 | | |
| 8 | −18.7868 | 0.499 | 1.48749 | 70.23 |
| 9 | 10.5135 | 1.382 | 1.73800 | 32.26 |
| 10 | 29.6141 | DD[10] | | |
| 11 (Aperture Stop) | ∞ | 1.861 | | |
| 12 | −10.2665 | 0.465 | 1.78590 | 44.20 |
| 13 | 16.9441 | 0.012 | | |
| 14 | 17.3787 | 2.343 | 1.51742 | 52.43 |
| 15 | −17.3787 | 3.715 | | |
| 16 | 46.7497 | 1.159 | 1.80518 | 25.42 |
| 17 | −46.7497 | DD[17] | | |
| 18 | 16.1146 | 2.693 | 1.49700 | 81.54 |
| 19 | −135.8991 | 4.532 | | |
| 20 | −96.4823 | 0.561 | 1.78590 | 44.20 |
| 21 | 11.8321 | 3.138 | 1.49700 | 81.54 |
| 22 | −16.0758 | 0.091 | | |
| 23 | 41.9300 | 1.381 | 1.58913 | 61.14 |
| 24 | −41.9300 | 0.582 | | |
| 25 | −17.6180 | 0.527 | 1.75520 | 27.51 |
| 26 | −66.5989 | DD[26] | | |
| 27 | 21.6119 | 1.450 | 1.62299 | 58.16 |
| 28 | ∞ | 5.595 | | |
| 29 | ∞ | 21.707 | 1.51633 | 64.14 |
| 30 | ∞ | 0.930 | 1.50847 | 61.19 |
| 31 | ∞ | | | |

TABLE 2

Example 1: Data Regarding Zooming

| | Wide Angle End | Intermediate Position | Telephoto End |
|---|---|---|---|
| Zoom Ratio | 1.00 | 1.37 | 1.87 |
| f | 10.00 | 13.70 | 18.70 |
| Bf | 20.53 | 20.53 | 20.53 |
| FNo. | 2.50 | 2.50 | 2.50 |
| 2ω[°] | 39.0 | 28.8 | 21.2 |
| DD[5] | 1.240 | 3.412 | 5.113 |
| DD[10] | 10.588 | 6.005 | 1.552 |
| DD[17] | 8.042 | 6.981 | 5.481 |
| DD[26] | 1.973 | 5.446 | 9.696 |
| Stop Diameter | 5.41 | 5.714 | 6.144 |

A through D of FIG. 7 respectively show aberration diagrams of spherical aberration, astigmatism, distortion, and lateral chromatic aberration of the projection zoom lens according to Example 1, at the wide angle end. E through H of FIG. 7 respectively show aberration diagrams of spherical aberration, astigmatism, distortion, and lateral chromatic aberration of the projection zoom lens according to Example 1, at the intermediate position. I through L of FIG. 7 respectively show aberration diagrams of spherical aberration, astigmatism, distortion, and lateral chromatic aberration of the projection zoom lens according to Example 1, at the telephoto end. As shown in FIG. 7, distortion is suppressed to within approximately 2% over the entire zoom range in Example 1. The same applies to the other Examples 2 through 6.

Each of the aberration diagrams of A through L of FIG. 7 applies the d-line as a reference. However, the spherical aberration diagram shows aberrations with respect to the C-line (wavelength: 656.3 nm) and the F-line (wavelength: 486.1 nm) as well, and the lateral chromatic aberration diagram also shows aberrations with respect to the C-line and the F-line. Further, the astigmatism diagram shows aberration in a sagittal direction with a solid line and aberration in a tangential direction with a broken line. The sign "Fno.", which is indicated above the vertical axis in the spherical aberration diagram, refers to the F number, and the sign "ω", which is indicated above the vertical axis in the other aberration diagrams, refers to a half angle of view. Note that these values are for when the projection distance is infinity.

Arrangement diagrams of lens groups, the symbols in the Tables and the aberration diagrams, the meanings thereof, and the manners in which they are shown for Example 1 described above are basically the same for Examples 2 through 6 below, unless otherwise noted. The points that the arrangement diagrams (FIG. 1) of the lens groups of Example 1 described above are at the wide angle end, at the intermediate position, and at the telephoto end, and that the aberration diagrams are at the wide angle end, the intermediate position, and the telephoto end also similarly apply to Examples 2 through 6.

EXAMPLE 2

FIG. 2 shows a collection of the arrangement of the lens groups in the projection zoom lens of Example 2 at the wide angle end, the telephoto end, and the intermediate position therebetween.

In the projection zoom lens of this Example 2, the first lens group G1 consists of three lenses: a negative first lens L1, a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other, and the fifth lens L5 and the sixth lens L6 are cemented to each other. Further, the seventh lens L7 and the eighth lens L8 are cemented to each other, and the eleventh lens L11 and the twelfth lens L12 are cemented to each other as well.

Table 3 shows the basic lens data of the projection zoom lens of Example 2. Further, Table 4 shows the specs of the projection zoom lens of Example 2 at each of the wide angle end, the intermediate position, and the telephoto end while changing magnification in the same manner as in Table 2.

TABLE 3

Example 2: Basic Lens Data

| Si Surface Number | Ri Radius of Curvature | Di Distance Between Surfaces | Ndj Refractive Index | vdj Abbe Number |
|---|---|---|---|---|
| 1 | 76.5490 | 0.874 | 1.80518 | 25.42 |
| 2 | 13.3935 | 3.988 | 1.72047 | 34.71 |
| 3 | −34212.0665 | 0.062 | | |
| 4 | 21.1772 | 2.080 | 1.77250 | 49.60 |
| 5 | 2815.0492 | DD[5] | | |
| 6 | 75.0061 | 0.622 | 1.61800 | 63.33 |
| 7 | 9.5305 | 2.429 | | |
| 8 | −24.4663 | 0.625 | 1.61800 | 63.33 |
| 9 | 9.2585 | 2.237 | 1.73800 | 32.26 |
| 10 | 36.2329 | DD[10] | | |
| 11 (Aperture Stop) | ∞ | 1.867 | | |
| 12 | −9.5751 | 0.626 | 1.80610 | 40.92 |
| 13 | 18.5396 | 2.597 | 1.51742 | 52.43 |
| 14 | −17.7270 | 3.486 | | |
| 15 | 58.5114 | 2.611 | 1.80518 | 25.42 |
| 16 | −33.7601 | DD[16] | | |
| 17 | 15.5439 | 3.543 | 1.49700 | 81.54 |
| 18 | −90.1437 | 4.275 | | |
| 19 | −59.6413 | 0.626 | 1.80610 | 40.92 |
| 20 | 11.6284 | 3.762 | 1.49700 | 81.54 |
| 21 | −19.9931 | 0.062 | | |
| 22 | 45.3783 | 1.745 | 1.58913 | 61.14 |
| 23 | −32.7877 | 0.547 | | |
| 24 | −18.2012 | 0.529 | 1.80518 | 25.42 |
| 25 | −39.9972 | DD[25] | | |
| 26 | 22.1653 | 1.763 | 1.62299 | 58.16 |
| 27 | −214748.3648 | 5.616 | | |
| 28 | ∞ | 21.781 | 1.51633 | 64.14 |
| 29 | ∞ | 0.933 | 1.50847 | 61.19 |
| 30 | ∞ | | | |

TABLE 4

Example 2: Data Regarding Zooming

| | Wide Angle End | Intermediate Position | Telephoto End |
|---|---|---|---|
| Zoom Ratio | 1.00 | 1.37 | 1.87 |
| f' | 10.00 | 13.70 | 18.70 |
| Bf | 20.60 | 20.60 | 20.60 |
| FNo. | 2.50 | 2.50 | 2.50 |
| 2ω[°] | 39.2 | 29.0 | 21.4 |
| DD[5] | 1.245 | 3.049 | 4.546 |
| DD[10] | 9.186 | 4.806 | 0.769 |
| DD[16] | 5.936 | 4.876 | 3.283 |
| DD[25] | 0.463 | 4.098 | 8.232 |
| Stop Diameter | 5.146 | 5.432 | 5.832 |

A through L of FIG. 8 respectively show the aberration diagrams of the projection zoom lens of Example 2.

EXAMPLE 3

FIG. 3 shows a collection of the arrangement of the lens groups in the projection zoom lens of Example 3 at the wide angle end, the telephoto end, and the intermediate position therebetween.

In the projection zoom lens of this Example 3, the first lens group G1 consists of three lenses: a negative first lens L1, a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other, and the fifth lens L5 and the sixth lens L6 are cemented to each other. Further, the seventh lens L7 and the eighth lens L8 are cemented to each other, and the eleventh lens L11 and the twelfth lens L12 are cemented to each other as well.

Table 5 shows the basic lens data of the projection zoom lens of Example 3. Further, Table 6 shows the specs of the projection zoom lens of Example 3 at each of the wide angle end, the intermediate position, and the telephoto end while changing magnification in the same manner as in Table 2.

TABLE 5

Example 3: Basic Lens Data

| Si Surface Number | Ri Radius of Curvature | Di Distance Between Surfaces | Ndj Refractive Index | vdj Abbe Number |
|---|---|---|---|---|
| 1 | 196.6138 | 0.875 | 1.80518 | 25.42 |
| 2 | 14.8356 | 3.694 | 1.83400 | 37.16 |
| 3 | −114.5447 | 0.062 | | |
| 4 | 23.1627 | 1.508 | 1.83400 | 37.16 |
| 5 | 68.0456 | DD[5] | | |
| 6 | 37.5400 | 0.623 | 1.61800 | 63.33 |
| 7 | 9.2583 | 2.701 | | |
| 8 | −21.7364 | 0.626 | 1.61800 | 63.33 |
| 9 | 10.1093 | 1.531 | 1.83400 | 37.16 |
| 10 | 38.9980 | DD[10] | | |
| 11 (Aperture Stop) | ∞ | 1.000 | | |
| 12 | −9.5725 | 0.626 | 1.80610 | 40.92 |
| 13 | 19.9128 | 2.573 | 1.48749 | 70.23 |
| 14 | −17.6173 | 2.220 | | |
| 15 | 64.8111 | 2.479 | 1.80518 | 25.42 |
| 16 | −28.1572 | DD[16] | | |
| 17 | 15.4157 | 3.636 | 1.49700 | 81.54 |
| 18 | −70.0910 | 3.203 | | |
| 19 | −77.5904 | 0.626 | 1.77250 | 49.60 |
| 20 | 11.1171 | 3.509 | 1.49700 | 81.54 |
| 21 | −21.5999 | 0.062 | | |
| 22 | 97.4566 | 1.494 | 1.58913 | 61.14 |
| 23 | −30.3414 | 0.600 | | |
| 24 | −17.4509 | 0.498 | 1.80518 | 25.42 |
| 25 | −42.8362 | DD[25] | | |
| 26 | 20.5835 | 1.874 | 1.62299 | 58.16 |
| 27 | −214748.3648 | 5.614 | | |
| 28 | ∞ | 21.790 | 1.51633 | 64.14 |
| 29 | ∞ | 0.934 | 1.50847 | 61.19 |
| 30 | ∞ | | | |

TABLE 6

Example 3: Data Regarding Zooming

| | Wide Angle End | Intermediate Position | Telephoto End |
|---|---|---|---|
| Zoom Ratio | 1.00 | 1.37 | 1.87 |
| f | 16.23 | 22.23 | 30.35 |
| Bf | 35.31 | 35.31 | 35.31 |
| FNo. | 2.50 | 2.50 | 2.50 |

TABLE 6-continued

Example 3: Data Regarding Zooming

| | Wide Angle End | Intermediate Position | Telephoto End |
|---|---|---|---|
| 2ω[°] | 39.2 | 29.0 | 21.4 |
| DD[5] | 0.697 | 2.692 | 4.354 |
| DD[10] | 10.051 | 5.415 | 1.173 |
| DD[16] | 13.318 | 11.734 | 9.514 |
| DD[25] | 0.453 | 4.678 | 9.479 |
| Stop Diameter | 5.144 | 5.504 | 6.008 |

A through L of FIG. 9 respectively show the aberration diagrams of the projection zoom lens of Example 3.

EXAMPLE 4

FIG. 4 shows a collection of the arrangement of the lens groups in the projection zoom lens of Example 4 at the wide angle end, the telephoto end, and the intermediate position therebetween.

In the projection zoom lens of this Example 4, the first lens group G1 consists of three lenses: a negative first lens L1, a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9 disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of one lens, a positive fifteenth lens L15.

Note that the first lens L1 and the second lens L2 are cemented to each other, and the fifth lens L5 and the sixth lens L6 are cemented to each other. Further, the eleventh lens L11 and the twelfth lens L12 are cemented to each other as well.

Table 7 shows the basic lens data of the projection zoom lens of Example 4. Further, Table 8 shows the specs of the projection zoom lens of Example 4 at each of the wide angle end, the intermediate position, and the telephoto end while changing magnification in the same manner as in Table 2.

TABLE 7

Example 4: Basic Lens Data

| Si Surface Number | Ri Radius of Curvature | Di Distance Between Surfaces | Ndj Refractive Index | vdj Abbe Number |
|---|---|---|---|---|
| 1 | 183.0727 | 0.809 | 1.84666 | 23.78 |
| 2 | 18.4457 | 3.387 | 1.72047 | 34.71 |
| 3 | −80.5449 | 0.062 | | |
| 4 | 22.4937 | 1.805 | 1.77250 | 49.60 |
| 5 | 254.0232 | DD[5] | | |
| 6 | 82.1705 | 0.558 | 1.61800 | 63.33 |
| 7 | 9.7437 | 2.120 | | |

TABLE 7-continued

Example 4: Basic Lens Data

| Si Surface Number | Ri Radius of Curvature | Di Distance Between Surfaces | Ndj Refractive Index | vdj Abbe Number |
|---|---|---|---|---|
| 8 | −22.3435 | 0.499 | 1.53715 | 74.81 |
| 9 | 10.0824 | 1.446 | 1.72047 | 34.71 |
| 10 | 33.8623 | DD[10] | | |
| 11 (Aperture Stop) | ∞ | 1.861 | | |
| 12 | −9.4830 | 0.620 | 1.80610 | 40.92 |
| 13 | 25.7302 | 0.040 | | |
| 14 | 28.3996 | 2.196 | 1.51742 | 52.43 |
| 15 | −17.3443 | 3.460 | | |
| 16 | 58.8269 | 2.190 | 1.80518 | 25.42 |
| 17 | −34.7210 | DD[17] | | |
| 18 | 15.1705 | 2.951 | 1.53715 | 74.81 |
| 19 | −128.7052 | 4.322 | | |
| 20 | −77.7489 | 0.623 | 1.80610 | 40.92 |
| 21 | 10.8170 | 3.074 | 1.49700 | 81.54 |
| 22 | −18.6816 | 0.062 | | |
| 23 | 53.9367 | 1.228 | 1.58913 | 61.14 |
| 24 | −56.9792 | 0.750 | | |
| 25 | −16.2349 | 0.543 | 1.80518 | 25.42 |
| 26 | −28.5157 | DD[26] | | |
| 27 | 20.9770 | 1.501 | 1.62041 | 60.29 |
| 28 | −4723.6871 | 5.593 | | |
| 29 | ∞ | 21.706 | 1.51633 | 64.14 |
| 30 | ∞ | 0.930 | 1.50847 | 61.19 |
| 31 | ∞ | | | |

TABLE 8

Example 4: Data Regarding Zooming

| | Wide Angle End | Intermediate Position | Telephoto End |
|---|---|---|---|
| Zoom Ratio | 1.00 | 1.37 | 1.87 |
| f | 10.00 | 13.70 | 18.70 |
| Bf | 20.52 | 20.52 | 20.52 |
| FNo. | 2.50 | 2.50 | 2.50 |
| 2ω[°] | 39.0 | 28.6 | 21.2 |
| DD[5] | 1.240 | 3.430 | 5.057 |
| DD[10] | 10.447 | 6.005 | 1.561 |
| DD[17] | 8.253 | 7.251 | 5.722 |
| DD[26] | 1.319 | 4.573 | 8.920 |
| Stop Diameter | 5.332 | 5.608 | 5.988 |

A through L of FIG. 10 respectively show the aberration diagrams of the projection zoom lens of Example 4.

EXAMPLE 5

FIG. 5 shows a collection of the arrangement of the lens groups in the projection zoom lens of Example 5 at the wide angle end, the telephoto end, and the intermediate position therebetween.

In the projection zoom lens of this Example 5, the first lens group G1 consists of three lenses: a negative first lens L1, a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of the aperture stop St which is a variable stop, and three lenses: a negative seventh lens L7, a positive eighth lens L8, and a positive ninth lens L9, disposed in this order from the magnification side.

The fourth lens group G4 consists of five lenses: a positive tenth lens L10, a negative eleventh lens L11, a positive twelfth lens L12, a positive thirteenth lens L13, and a negative fourteenth lens L14 disposed in this order from the magnification side. The fifth lens group G5 consists of two lenses: a positive fifteenth lens L15 and a negative sixteenth lens L16.

Note that the first lens L1 and the second lens L2 are cemented to each other, and the fifth lens L5 and the sixth lens L6 are cemented to each other. Further, the eleventh lens L11 and the twelfth lens L12 are cemented to each other as well.

Table 9 shows the basic lens data of the projection zoom lens of Example 5. Further, Table 10 shows the specs of the projection zoom lens of Example 5 at each of the wide angle end, the intermediate position, and the telephoto end while changing magnification in the same manner as in Table 2.

TABLE 9

Example 5: Basic Lens Data

| Si Surface Number | Ri Radius of Curvature | Di Distance Between Surfaces | Ndj Refractive Index | vdj Abbe Number |
|---|---|---|---|---|
| 1 | −310.0543 | 0.685 | 1.80518 | 25.42 |
| 2 | 18.1935 | 4.782 | 1.72047 | 34.71 |
| 3 | −45.4029 | 0.062 | | |
| 4 | 20.8147 | 1.735 | 1.77250 | 49.60 |
| 5 | 83.7336 | DD[5] | | |
| 6 | 42.8586 | 0.558 | 1.61800 | 63.33 |
| 7 | 9.3363 | 2.361 | | |
| 8 | −17.3003 | 0.499 | 1.48749 | 70.23 |
| 9 | 10.6166 | 1.382 | 1.73800 | 32.26 |
| 10 | 29.5697 | DD[10] | | |
| 11 (Aperture Stop) | ∞ | 1.860 | | |
| 12 | −9.9334 | 0.465 | 1.78590 | 44.20 |
| 13 | 15.6608 | 0.012 | | |
| 14 | 16.0501 | 2.383 | 1.51742 | 52.43 |
| 15 | −16.5266 | 3.405 | | |
| 16 | 45.0420 | 1.226 | 1.80518 | 25.42 |
| 17 | −44.5094 | DD[17] | | |
| 18 | 15.3760 | 3.098 | 1.49700 | 81.54 |
| 19 | −39.6731 | 2.618 | | |
| 20 | −81.8101 | 0.561 | 1.78590 | 44.20 |
| 21 | 10.5814 | 3.346 | 1.49700 | 81.54 |
| 22 | −17.4175 | 0.062 | | |
| 23 | −261.4236 | 1.302 | 1.58913 | 61.14 |
| 24 | −22.6394 | 0.499 | | |
| 25 | −14.0401 | 0.527 | 1.75520 | 27.51 |
| 26 | −35.0066 | DD[26] | | |
| 27 | 20.7887 | 1.647 | 1.66998 | 39.27 |
| 28 | −126.5791 | 0.062 | | |
| 29 | −93.0163 | 0.465 | 1.80518 | 25.42 |
| 30 | ∞ | 5.587 | | |
| 31 | ∞ | 21.704 | 1.51633 | 64.14 |
| 32 | ∞ | 0.930 | 1.50847 | 61.19 |
| 33 | ∞ | | | |

TABLE 10

Example 5: Data Regarding Zooming

| | Wide Angle End | Intermediate Position | Telephoto End |
|---|---|---|---|
| Zoom Ratio | 1.00 | 1.37 | 1.87 |
| f | 18.05 | 24.73 | 33.76 |
| Bf | 37.50 | 37.50 | 37.50 |
| FNo. | 2.50 | 2.50 | 2.50 |
| 2ω[°] | 39.0 | 28.6 | 21.2 |
| DD[5] | 1.240 | 3.461 | 5.124 |
| DD[10] | 10.587 | 6.058 | 1.557 |
| DD[17] | 9.302 | 8.317 | 6.811 |
| DD[26] | 1.161 | 4.454 | 8.798 |

TABLE 10-continued

Example 5: Data Regarding Zooming

|  | Wide Angle End | Intermediate Position | Telephoto End |
|---|---|---|---|
| Stop Diameter | 5.368 | 5.65 | 6.076 |

A through L of FIG. 11 respectively correspond to the aberration diagrams of the projection zoom lens of Example 5.

EXAMPLE 6

FIG. 6 shows a collection of the arrangement of the lens groups in the projection zoom lens of Example 6 at the wide angle end, the telephoto end, and the intermediate position therebetween.

In the projection zoom lens of this Example 6, the first lens group G1 consists of three lenses: a negative first lens L1, a positive second lens L2, and a positive third lens L3 disposed in this order from the magnification side. The second lens group G2 consists of three lenses: a negative fourth lens L4, a negative fifth lens L5, and a positive sixth lens L6 disposed in this order from the magnification side.

The third lens group G3 consists of a negative seventh lens L7, a positive eighth lens L8, the aperture stop St, a positive ninth lens L9, a positive tenth lens L10, a negative eleventh lens L11, a positive twelfth lens L12, a positive thirteenth lens L13, and a negative fourteenth lens L14 disposed in this order from the magnification side. The fourth lens group G4 consists of one lens, a positive fifteenth lens L15.

Note that the first lens L1 and the second lens L2 are cemented to each other, and the fifth lens L5 and the sixth lens L6 are cemented to each other. The seventh lens L7 and the eighth lens L8 are cemented to each other, and the eleventh lens L11 and the twelfth lens L12 are cemented to each other.

Table 11 shows the basic lens data of the projection zoom lens of Example 6. Further, Table 12 shows the specs of the projection zoom lens of Example 6 at each of the wide angle end, the intermediate position, and the telephoto end while changing magnification in the same manner as in Table 2.

TABLE 11

Example 6: Basic Lens Data

| Si Surface Number | Ri Radius of Curvature | Di Distance Between Surfaces | Ndj Refractive Index | vdj Abbe Number |
|---|---|---|---|---|
| 1 | 109.3808 | 0.811 | 1.84666 | 23.78 |
| 2 | 17.8785 | 2.598 | 1.77250 | 49.60 |
| 3 | −149.7850 | 0.057 | | |
| 4 | 16.2454 | 1.890 | 1.79952 | 42.22 |
| 5 | 99.9704 | DD[5] | | |
| 6 | 36.8176 | 0.577 | 1.61800 | 63.33 |
| 7 | 7.3686 | 2.361 | | |
| 8 | −17.6091 | 0.580 | 1.61800 | 63.33 |
| 9 | 7.8685 | 1.226 | 1.80000 | 29.85 |
| 10 | 26.7206 | DD[10] | | |
| 11 | −8.5721 | 0.580 | 1.83400 | 37.16 |
| 12 | 13.5215 | 2.443 | 1.57501 | 41.50 |
| 13 | −14.1398 | 0.437 | | |
| 14 (Aperture Stop) | ∞ | 1.000 | | |
| 15 | 50.5887 | 2.127 | 1.84666 | 23.78 |
| 16 | −34.9812 | 6.647 | | |
| 17 | 13.6384 | 3.262 | 1.49700 | 81.54 |
| 18 | −39.6005 | 3.126 | | |
| 19 | −54.1676 | 0.464 | 1.74400 | 44.78 |
| 20 | 9.0886 | 3.305 | 1.49700 | 81.54 |
| 21 | −14.8285 | 0.057 | | |
| 22 | 64.8979 | 1.241 | 1.58913 | 61.14 |
| 23 | −33.2219 | 0.847 | | |
| 24 | −12.6101 | 0.461 | 1.80610 | 33.27 |
| 25 | −46.0468 | DD[25] | | |
| 26 | 27.3313 | 2.042 | 1.62299 | 58.16 |
| 27 | −27.4870 | 5.206 | | |
| 28 | ∞ | 21.053 | 1.51633 | 64.14 |
| 29 | ∞ | | | |

TABLE 12

Example 6: Data Regarding Zooming

|  | Wide Angle End | Intermediate Position | Telephoto End |
|---|---|---|---|
| Zoom Ratio | 1.00 | 1.32 | 1.73 |
| f | 10.00 | 13.20 | 17.30 |
| Bf | 19.09 | 19.09 | 19.09 |
| FNo. | 2.48 | 2.49 | 2.51 |
| 2ω[°] | 36.6 | 27.6 | 21.4 |
| DD[5] | 0.659 | 2.527 | 3.879 |
| DD[10] | 8.618 | 5.673 | 2.016 |
| DD[25] | 0.427 | 1.504 | 3.809 |
| Stop Diameter | 7.16 | 7.16 | 7.16 |

A through L of FIG. 12 respectively correspond to the aberration diagrams of the projection zoom lens of Example 6.

TABLE 13

| Conditional Formula | Example 1 | Example 2 | Example 3 | Example 4 | Example 5 | Example 6 |
|---|---|---|---|---|---|---|
| (1) d/fw | 0.34 | 0.22 | 0.23 | 0.28 | 0.33 | 0.25 |
| (2) fe/fw | 3.47 | 3.56 | 3.30 | 3.37 | 3.45 | 2.23 |
| (3) m+/fw | 0.77 | 0.78 | 0.90 | 0.76 | 0.76 | 0.34 |
| (4) fl/fw | 2.67 | 2.51 | 2.70 | 2.61 | 2.64 | 2.00 |
| (5) Bf/fw | 2.05 | 2.06 | 2.06 | 2.05 | 2.05 | 1.91 |
| (6) Zr | 1.87 | 1.87 | 1.87 | 1.87 | 1.87 | 1.73 |

TABLE 14

| Condition | Example 1 | Example 2 | Example 3 | Example 4 | Example 5 | Example 6 |
|---|---|---|---|---|---|---|
| f2/fw | −1.18 | −1.05 | −1.21 | −1.15 | −1.17 | −0.86 |
| f3/fw | −9.36 | −10.11 | −10.11 | −9.42 | −9.56 | 3.41 |
| f4/fw | 3.19 | 3.25 | 3.53 | 3.31 | 3.26 | — |

The present invention has been described with reference to the Embodiments and Examples. The projection zoom lenses of the present invention are not limited to the Examples above, and various modifications are possible. For example, values, such as the radii of curvature, the distances between surfaces, the refractive indices, and the Abbe numbers of each lens can be changed as appropriate.

Further, the projection type display device of the present invention is also not limited to the configuration described above. For example, the light valves to be utilized and optical members used for the beam separation or beam composition are not limited to the above configurations, and various modifications are possible.

What is claimed is:

1. A projection zoom lens consisting of:
a first lens group having a positive refractive power that is positioned at the most-magnification side and is fixed while changing magnification;
a final lens group having a positive refractive power that is positioned at the most-reduction side and is fixed while changing magnification; and
an intermediate group positioned between the first lens group and the final lens group, the intermediate group consisting of three moving lens groups that move independently from each other along the optical axis while changing magnification, wherein
the reduction side is telecentric,
the intermediate group consists of a moving lens group having a negative refractive power, a moving lens group having a negative refractive power, and a moving lens group having a positive refractive power in this order from the magnification side, and
the projection zoom lens satisfies conditional formulas (1) and (2) below:

$$d/fw<1.0 \qquad (1),$$

$$1.5<fe/fw<7.0 \qquad (2),$$

where,
d: the distance between the most-reduction-side lens surface of the intermediate group and the most-reduction-side lens surface of the final lens group along the optical axis at the wide angle end,
fw: the focal length of the entire system at the wide angle end, and
fe: the focal length of the final lens group.

2. The projection zoom lens of claim 1 that satisfies conditional formula (1') below:

$$d/fw<0.5 \qquad (1').$$

3. The projection zoom lens of claim 1 that satisfies conditional formula (2') below:

$$2.0<fe/fw<5.0 \qquad (2').$$

4. The projection zoom lens of claim 1, wherein the final lens group consists of two or less lenses.

5. The projection zoom lens of claim 4, wherein the final lens group consists of one single lens having a positive refractive power.

6. The projection zoom lens of claim 1 that satisfies conditional formula (4) below:

$$1.0<f1/fw<5.0 \qquad (4),$$

where,
f1: the focal length of the first lens group, and
fw: the focal length of the entire system at the wide angle end.

7. The projection zoom lens of claim 1 that satisfies conditional formula (5) below:

$$0.7<Bf/fw \qquad (5),$$

where,
Bf: the back focus, which is an air converted length, at the reduction side of the entire system at the wide angle end, and
fw: the focal length of the entire system at the wide angle end.

8. The projection zoom lens of claim 1 that comprises an aperture stop disposed between adjacent moving lens groups or within one moving lens group in the intermediate group, wherein
the aperture stop is a variable stop that varies the aperture diameter such that the numerical aperture of the zoom lens is constant over the entire zoom range.

9. The projection zoom lens of claim 1 that satisfies conditional formula (6) below:

$$1.4<Zr \qquad (6),$$

where,
Zr: the zoom ratio of the telephoto end with respect to the wide angle end.

10. A projection type display device comprising:
a light source;
a light valve into which light from the light source enters; and
the projection zoom lens of claim 1 that projects an optical image formed by the light modulated by the light valve onto a screen.

* * * * *